(12) United States Patent
An et al.

(10) Patent No.: US 11,456,613 B2
(45) Date of Patent: Sep. 27, 2022

(54) ELECTRONIC DEVICE EQUIPPED WITH FLEXIBLE DISPLAY AND WIRELESS CHARGING METHOD USING THE SAME

(71) Applicant: Samsung Electronics Co., Ltd., Gyeonggi-do (KR)

(72) Inventors: Jungchul An, Gyeonggi-do (KR); Sungho Lee, Gyeonggi-do (KR); Hanchul Jung, Gyeonggi-do (KR); Youngin Choi, Gyeonggi-do (KR); Jungsik Park, Gyeonggi-do (KR); Donghyun Yeom, Gyeonggi-do (KR); Minwoo Yoo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 16/374,914

(22) Filed: Apr. 4, 2019

(65) Prior Publication Data
US 2019/0312451 A1    Oct. 10, 2019

(30) Foreign Application Priority Data

Apr. 9, 2018    (KR) .................. 10-2018-0041196

(51) Int. Cl.
*H02J 7/02*       (2016.01)
*H02J 50/10*    (2016.01)
(Continued)

(52) U.S. Cl.
CPC ............ *H02J 7/025* (2013.01); *G06F 1/1652* (2013.01); *G06F 3/0412* (2013.01);
(Continued)

(58) Field of Classification Search
CPC .. H02J 50/10; H02J 50/70; H02J 50/80; H02J 7/025; H02J 7/0042; G06F 1/1652;
(Continued)

(56) References Cited

U.S. PATENT DOCUMENTS 9,594,402 B2 *   3/2017   Hiroki .................... G06F 1/1652
9,654,605 B2 *   5/2017   Goldfain ............. H04M 1/0262
(Continued)

FOREIGN PATENT DOCUMENTS

CN            113873060 A *  8/2018  .......... G06F 1/1641
KR     10-2012-0131584 A    12/2012
(Continued)

OTHER PUBLICATIONS

International Search Report dated Jul. 12, 2019.
European Search Report dated Feb. 5, 2021.

*Primary Examiner* — Helen Rossoshek
(74) *Attorney, Agent, or Firm* — Cha & Reiter, LLC

(57) ABSTRACT

According to certain embodiments, an electronic device comprises a housing including a first plate, a second plate spaced apart from the first plate and facing away from the first plate, and a side member at least partially surrounding a space between the first plate and the second plate; a touchscreen display including a first portion exposed through or mounted on at least part of the first plate, and a second portion extending from the first portion and bendable into the space such that the second portion is positioned or positionable between the first portion and the second plate; a conductive coil disposed in a space between the first portion and the second plate or in a space between the first portion and the second portion in parallel to the second plate; a wireless charging circuit electrically connected to the conductive coil; a first shielding layer interposed between the conductive coil and at least part of the first portion of the touchscreen display; and a second shielding layer interposed between the second plate and at least part of the second portion of the touchscreen display.

9 Claims, 27 Drawing Sheets

(51) Int. Cl.
*G06F 3/041* (2006.01)
*G06F 1/16* (2006.01)

(52) U.S. Cl.
CPC ............ *G06F 3/0416* (2013.01); *H02J 50/10* (2016.02); *G06F 2203/04102* (2013.01)

(58) Field of Classification Search
CPC .... G06F 1/1624; G06F 1/1656; G06F 1/1698; G06F 1/266; G06F 1/3206; G06F 1/3218; G06F 1/3262; G06F 1/3265; G06F 1/328; G06F 3/041; G06F 3/0412; G06F 3/0416; G06F 2203/04102; G06F 2203/04107; Y02D 10/00; H05K 9/0096
See application file for complete search history.

(56) References Cited

U.S. PATENT DOCUMENTS

| | | | | |
|---|---|---|---|---|
| 9,996,201 | B2* | 6/2018 | Kim | G06F 1/1637 |
| 10,051,096 | B2 | 8/2018 | Baek et al. | |
| 10,236,942 | B2* | 3/2019 | Lee | H01Q 1/243 |
| 10,809,835 | B2* | 10/2020 | Byeon | G06F 3/0412 |
| 2012/0299966 | A1 | 11/2012 | Kim et al. | |
| 2014/0337621 | A1* | 11/2014 | Nakhimov | H04W 12/068 713/168 |
| 2015/0138736 | A1* | 5/2015 | Catchpole | G06F 1/1652 361/749 |
| 2015/0261254 | A1* | 9/2015 | Hiroki | G06F 1/1652 361/679.03 |
| 2015/0277496 | A1* | 10/2015 | Reeves | G09F 9/301 345/1.2 |
| 2016/0099516 | A1* | 4/2016 | Kim | G06F 1/1684 361/752 |
| 2016/0134737 | A1* | 5/2016 | Pulletikurty | G06F 1/163 715/735 |
| 2018/0040950 | A1 | 2/2018 | Lee et al. | |
| 2018/0090974 | A1 | 3/2018 | Elkayam et al. | |
| 2019/0245954 | A1* | 8/2019 | Liu | H01Q 1/243 |
| 2020/0026327 | A1* | 1/2020 | Hendren | G06F 1/1643 |
| 2020/0093014 | A1* | 3/2020 | Merenda | H04M 1/6058 |
| 2021/0099027 | A1* | 4/2021 | Larsson | H02J 50/80 |

FOREIGN PATENT DOCUMENTS

| | | |
|---|---|---|
| KR | 10-1406234 B1 | 6/2014 |
| KR | 10-2016-0086248 A | 7/2016 |
| KR | 10-2016-0097106 A | 8/2016 |
| WO | 2010/129369 A2 | 11/2010 |

* cited by examiner

ELECTRONIC DEVICE EQUIPPED WITH FLEXIBLE DISPLAY AND WIRELESS CHARGING METHOD USING THE SAME

CROSS-REFERENCE TO RELATED APPLICATION(S)

This application is based on and claims priority under 35 U.S.C. 119 to Korean Patent Application No. 10-2018-0041196, filed on Apr. 9, 2018, in the Korean Intellectual Property Office, the disclosures of which are herein incorporated by reference in their entireties.

BACKGROUND

1) Field

Certain embodiments of the disclosure relate to an electronic device including a flexible display and a wireless charging method using the same.

2) Description of Related Art

As technology advances, there are techniques for wirelessly charging a battery. The wireless charging technology uses wireless power transmission and reception, and it is possible to automatically charge a battery merely by placing the electronic device on a charging pad without connecting the electronic device to a separate charging connector.

The above information is presented as background information only to assist with an understanding of the disclosure. No determination has been made, and no assertion is made, as to whether any of the above might be applicable as prior art with regard to the disclosure.

SUMMARY

An electronic device may include a display extending to at least one side face, and when the display is activated during wireless charging, distortion of the display extending to the at least one side face may occur. This phenomena may be transferred to the front face of the display also distorting the front face. Distorting the front face results in flickering and artifacts, thereby resulting in a poor image to the user.

According to certain embodiments, it is possible to provide a method for preventing the display from being distorted during the wireless charging of an electronic device.

An electronic device according to certain embodiments is able to perform control such that at least part of the display thereof is deactivated when the display is in an active state during wireless charging.

An electronic device according to certain embodiments is able to perform control such that at least some of multiple wireless charging circuits disposed in the electronic device are deactivated when the display is in an active state during wireless charging.

According to certain embodiments, According to certain embodiments, an electronic device comprises a housing including a first plate, a second plate spaced apart from the first plate and facing away from the first plate, and a side member at least partially surrounding a space between the first plate and the second plate; a touchscreen display including a first portion exposed through or mounted on at least part of the first plate, and a second portion extending from the first portion and bendable into the space such that the second portion is positioned or positionable between the first portion and the second plate; a conductive coil disposed in a space between the first portion and the second plate or in a space between the first portion and the second portion in parallel to the second plate; a wireless charging circuit electrically connected to the conductive coil; a first shielding layer interposed between the conductive coil and at least part of the first portion of the touchscreen display; and a second shielding layer interposed between the second plate and at least part of the second portion of the touchscreen display.

According to certain embodiments, an electronic device comprises a housing including a first plate, a second plate spaced apart from the first plate and facing away from the first plate, and a side member at least partially surrounding a space between the first plate and the second plate; a touchscreen display including a first portion exposed through or mounted on at least part of the first plate, and a second portion extending from the first portion and bendable into the space such that the second portion is positionable between the first portion and the second plate; a conductive coil disposed in a space between the first portion and the second plate or disposed in a space between the second portion and the second plate in parallel to the second plate; a wireless charging circuit electrically connected to the conductive coil; a memory; and at least one processor electrically connected to the housing, the touchscreen display, the conductive coil, the wireless charging circuit, and the memory, wherein the at least one processor is configured to deactivate at least part of the second portion of the touchscreen display when the touchscreen display is in an active state during reception of power by the conductive coil.

According to certain embodiments, an electronic device comprising a housing including a first plate, a second plate spaced apart from the first plate and facing away from the first plate, and a side member at least partially surrounding a space between the first plate and the second plate; a touchscreen display including a first portion exposed through or mounted on at least part of the first plate, and a second portion extending from the first portion and bendable into the space such that the second portion is positionable between the first portion and the second plate; multiple conductive coils disposed in a space between the first portion and the second plate or disposed in a space between the second portion and the second plate in parallel to the second plate; a wireless charging circuit electrically connected to the conductive coil; a memory; and at least one processor electrically connected to the housing, the touchscreen display, the multiple conductive coils, the wireless charging circuit, and the memory, wherein the at least one processor is configured to deactivate at least one conductive coil overlapping the second portion of the second touchscreen display among the multiple conductive coils when the touchscreen display is in an active state during reception of power by remaining ones of the multiple conductive coils.

An electronic device according to certain embodiments is can prevent a display from being distorted by a magnetic field generated by wireless charging. In addition, when the display is in the active state during wireless charging, the electronic device may perform control such that at least part of the display or at least part of the wireless charging circuit is deactivated, thereby providing a flicker-free and afterimage-free display.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
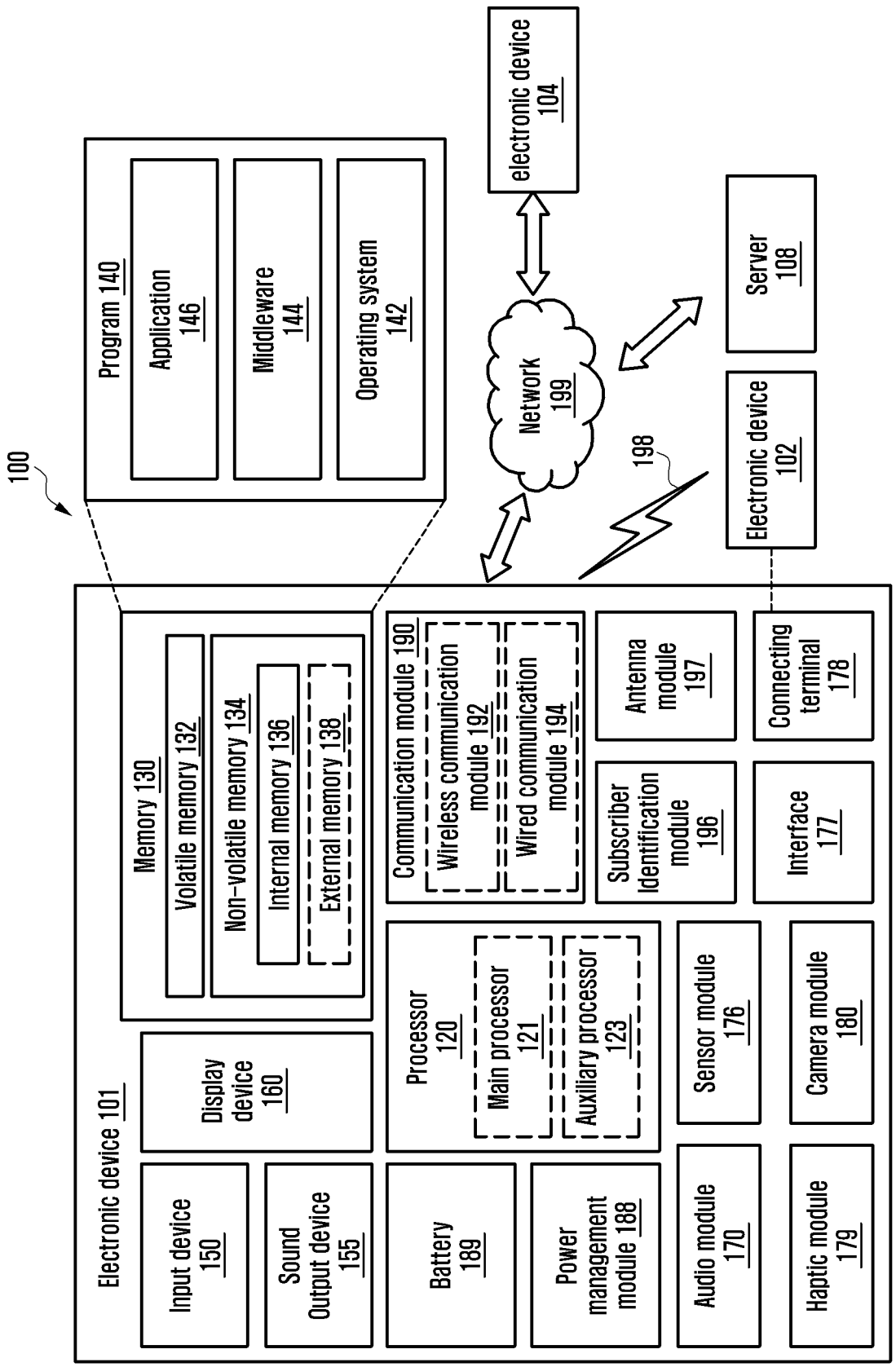
FIG. 1 is a block diagram illustrating an electronic device including a flexible display in a network environment according to certain embodiments.

FIG. 1 is a block diagram illustrating a configuration of an electronic device 101 for processing a search keyword in a network environment 100 according to certain embodiments of the present invention.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC). The power management module 188 can include a wireless charging module 250 and will be described in greater detail in FIG. 2.

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. The wireless communication module 192 will be described in FIG. 2.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. Additionally, the antenna module can be used to receive wireless charging.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
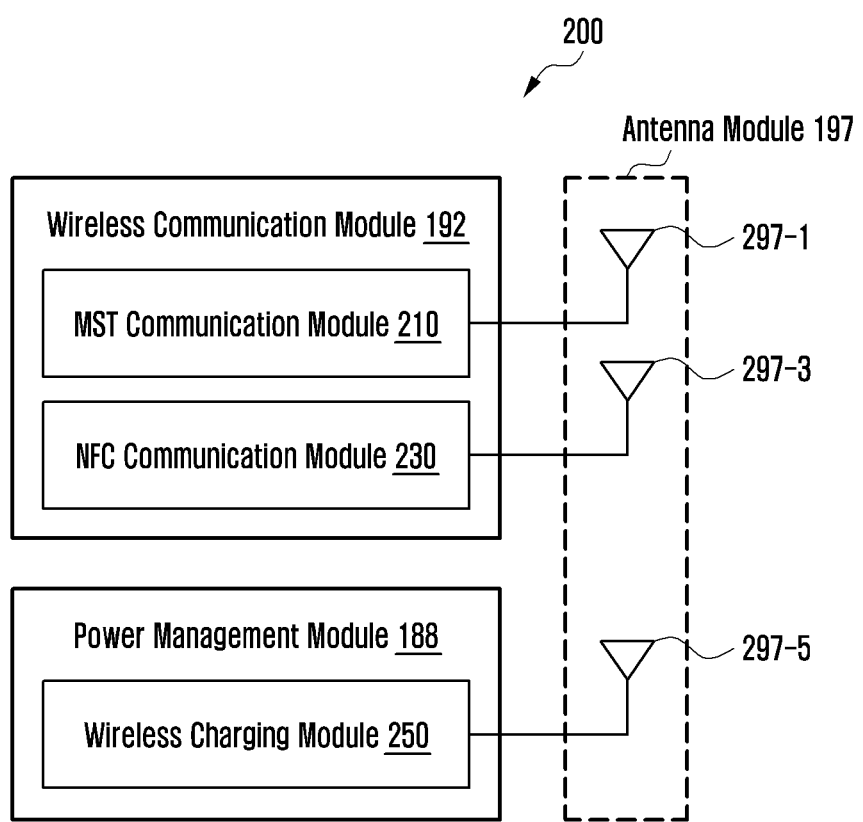
FIG. 2 is a block diagram illustrating a wireless communication module, a power management module, and an antenna module of an electronic device according to certain embodiments.

FIG. 2 is a block diagram 200 illustrating the wireless communication module 192, the power management module 188, and the antenna module 197 of the electronic device 101 according to certain embodiments.

Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or omitted from the description.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 230 may obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Figure 3:
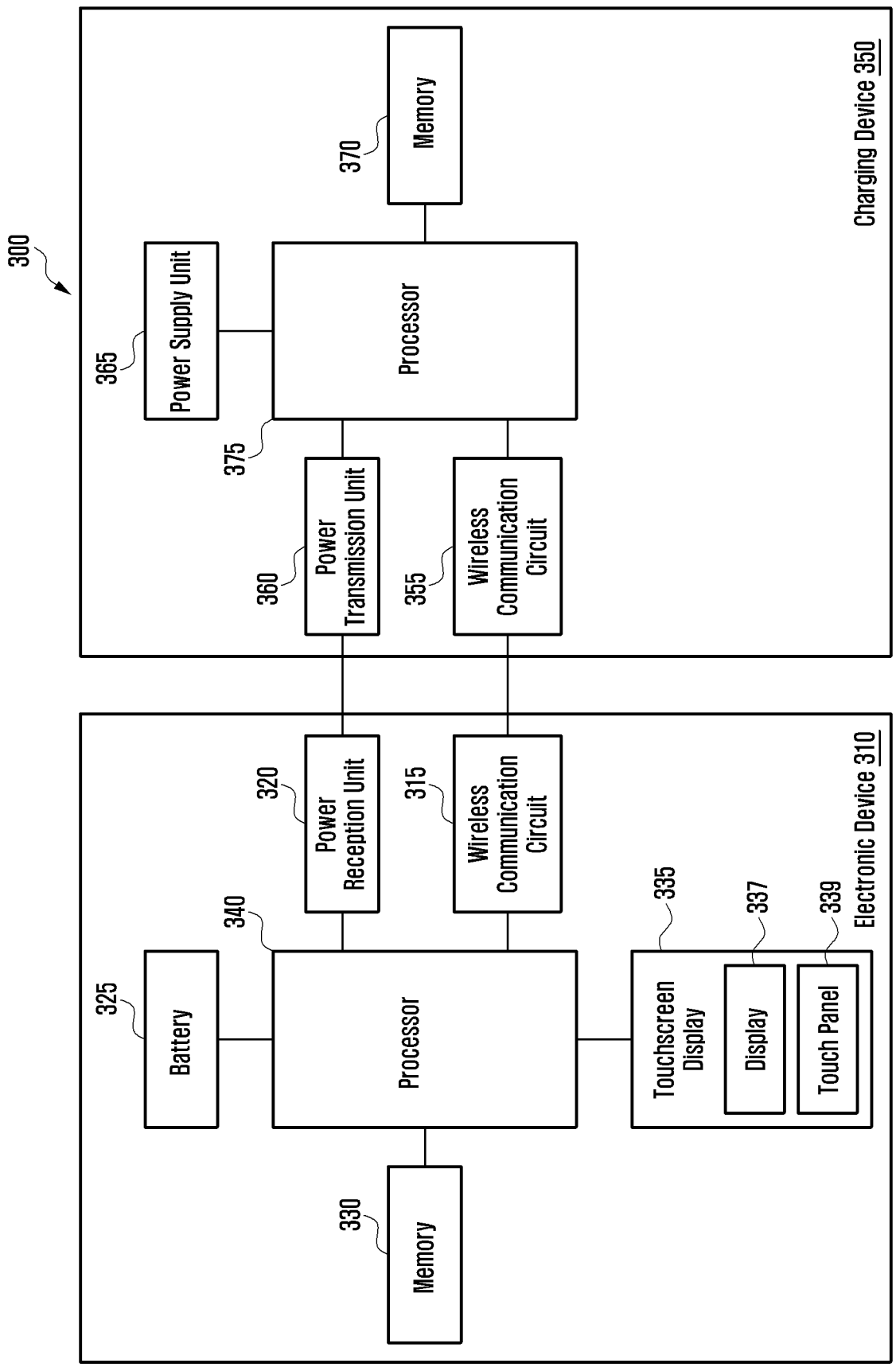
FIG. 3 is a block diagram illustrating an electronic device including a flexible display according to certain embodiments and a charging device.

FIG. 3 is a block diagram 300 illustrating an electronic device including a flexible display according to certain embodiments and a charging device.

Referring to FIG. 3, an electronic device 310 (e.g., the electronic device 101 in FIG. 1) includes a wireless communication circuit 315 (e.g., the communication module 190 in FIG. 1), a power reception unit 320 (e.g., the wireless charging module 250 in FIG. 2), a battery 325 (e.g., the battery 189 in FIG. 1), a memory 330 (e.g., the memory 130 in FIG. 1), a touchscreen display 335 (e.g., the display 160 in FIG. 1), and a processor 340 (e.g., the processor 120 in FIG. 1).

According to certain embodiments, the wireless communication circuit 315 may be wirelessly connected to a network to communicate with external electronic devices (e.g., the electronic devices 102 and 104 and the server 108 in FIG. 1).

In an embodiment, the electronic device 310 may communicate with an external electronic device (e.g., a charging device 350) via the wireless communication circuit 315. When a power signal is received from the charging device 350, the electronic device 310 may transmit power information to the charging device 350 via the wireless communication circuit 315. The power information may include at least one of output voltage information and charging current information of the electronic device 310. For example, the power information can include remaining number of ampere-hours (Ah), and maximum number of ampere-hours at full capacity.

According to certain embodiments, the power reception unit 320 may receive the wireless power supplied from the charging device 350 to charge the battery 325. When a magnetic field is formed in a coil of the charging device 350 (e.g., a transmission coil (Tx coil)), a coil of the electronic device 310 (e.g., a reception coil (Rx coil) is energized by electromagnetic induction, so that the battery 325 can be charged under the control of the processor 340.

According to certain embodiments, the memory 330 may store an algorithm, a program, or an application for controlling the overall operation of the electronic device 310.

According to certain embodiments, the touchscreen display 335 may be formed in an integrated form including a display 337 and a touch panel 339. The display 337 may display various screens according to the use of the electronic device 310. The display 337 may include a liquid crystal display (LCD), a light-emitting diode (LED) display, an organic light-emitting diode (OLED) display, a microelectromechanical system (MEMS), or an electronic paper display. The display 337 may display, for example, various contents (e.g., text, image, video, icon, or symbol) to the user. The touch panel 339 may receive a touch, gesture, proximity, or hovering input using, for example, an electronic pen or a portion of the user's body.

In an embodiment, the display 337 may be a flexible display. The flexible display can be curved, bent, or rolled without being damaged because of a substrate, which is thin and flexible like paper. In some embodiments, the flexible display when curved, bent or rolled may offer mild resistance, which can be overcome with very little user force. Moreover, when curved, bent, or rolled, the flexible display may urge straightening.

In an embodiment, the flexible display extends to at least one side face (e.g., at least one of the left, right, top, and bottom side faces) of the electronic device 310 and is bent in a radius of curvature less than or equal to an operable radius of curvature to be fastened to the side face of the electronic device 310.

In an embodiment, the display 337 may display the charged state of the electronic device 310 under the control of the processor 340. The display 337 may display the time at which the electronic device 310 is expected to complete charging under the control of the processor 340.

According to certain embodiments, the processor 340 may control signal flows of the overall operation of the electronic device 310 and between the internal components of the electronic device 310, may perform data processing, and may control the power supply to the components from the battery 325.

In an embodiment, when the display 337 is in an active state during the charging of the battery 325 by receiving, via the power reception unit 360, wireless power transmitted by the power transmission unit 360 of the charging device 350, the processor 340 may perform control such that at least part of the display 337 is deactivated. For example, the processor 340 may perform control such that at least part of the display 337, which overlaps at least one of a reception coil disposed in the electronic device 310 and a transmission coil disposed in the charging device 350 is deactivated.

In an embodiment, when the display 337 is in an active state during the charging of the battery 325 by receiving, via the power reception unit 360, wireless power transmitted by the power transmission unit 360 of the charging device 350, the processor 340 may perform control such that at least one reception coil overlapping at least part of the display 337 among multiple reception coils disposed in the electronic device 310 is deactivated.

In an embodiment, during the charging of the battery 325 by receiving, via the power reception unit 320, wireless power transmitted by the power transmission unit 360 of the charging device 350, the processor 340 may transmit state information of the display 337 to the charging device 350 via the wireless communication circuit 315. For example, the state information of the display 337 may be information indicating whether the display 337 is in the active state or the inactive state.

According to certain embodiments, the charging device 350 may include a wireless communication circuit 355, a power transmission unit 360, a power supply unit 365, a memory 370, and a processor 375.

According to certain embodiments, the charging device 350 may communicate with the electronic device 310 via the wireless communication circuit 355. The charging device 350 may receive power information from the electronic device 310 (e.g., the wireless communication circuit 315) via the wireless communication circuit 355. For example, the received power information may include at least one of remaining ampere-hours and charging current information of the electronic device 310.

In an embodiment, the charging device 350 may transmit information using electronic communication (e.g., in-band communication or out-of-band communication) with the electronic device 310. For example, the in-band communication may mean communication that exchanges information between the electronic device 310 and the charging device 350 via a wireless power transmission coil using a signal having a frequency used for wireless power transmission. In an embodiment, a communication module for the in-band communication may be included in the power reception unit 320 of the electronic device 310 and the power transmission unit 360 of the charging device 350. The out-of-band communication may mean communication that exchanges information necessary for power transmission using a separate frequency band other than a resonance frequency band. For example, the charging device 350 may transmit/receive power information from/to the wireless communication circuit 315 of the electronic device 310 using the wireless communication circuit 355.

In an embodiment, the charging device 350 may adjust the power supplied to the electronic device 310 on the basis of the power information of the electronic device 310 received via the wireless communication circuit 355.

According to certain embodiments, the power transmission unit 360 may provide power to at least one electronic device (e.g., the electronic device 310) having, for example, a battery 325 or a power supply unit. The power transmission unit 360 may include at least one induction coil and at least one resonance coil.

In an embodiment, the power transmission unit 360 may provide power required by the electronic device 310 and may provide the power to the electronic device 310 in a wireless manner. When a magnetic field is formed on a coil (e.g., a Tx coil), the power transmission unit 360 may supply the magnetic field to the power reception unit 320 of the electronic device 310.

According to certain embodiments, the power supply unit 365 may receive AC power (e.g., 220V) applied from the outside and may convert the applied AC power into DC power. The power supply unit 365 may be typically supplied with power from the outside by inserting a terminal (e.g., an adapter) into a wall outlet.

According to certain embodiments, the memory 370 may store an algorithm, a program, or an application for controlling the overall operation of the charging device 350.

According to certain embodiments, the processor 375 may control the overall operation of the charging device 350. The processor 375 may control the overall operation of the charging device 350 using an algorithm, a program, or an application required for control and stored in the memory 370.

In an embodiment, the processor 375 may execute or control, for example, wireless arithmetic calculation or data processing related to control or communication of one or more different components of the charging device 350 and/or wireless charging transmission mode through a coil.

In an embodiment, the processor 375 may transmit power to the power reception unit 320 of the electronic device 310 via the power transmission unit 360.

In an embodiment, the processor 375 may receive, from the electronic device 310, the state information of the display 337, for example, information indicating that the display 337 is in the active state, during the transmission of power to the power reception unit 320. When the information indicating that the display 337 is in the active state is received, the processor 375 may deactivate (send control signals causing deactivation) at least one of the multiple transmission coils disposed in the charging device 310.

In an embodiment, the processor 375 may receive, from the electronic device 310, information indicating that the display 337 has been switched into the inactive state, during the transmission of power to the power reception unit 320. Upon receiving the information indicating that the display 337 is switched into the inactive state, the processor 375 may activate the at least one deactivated transmission coil.

Figure 4A:
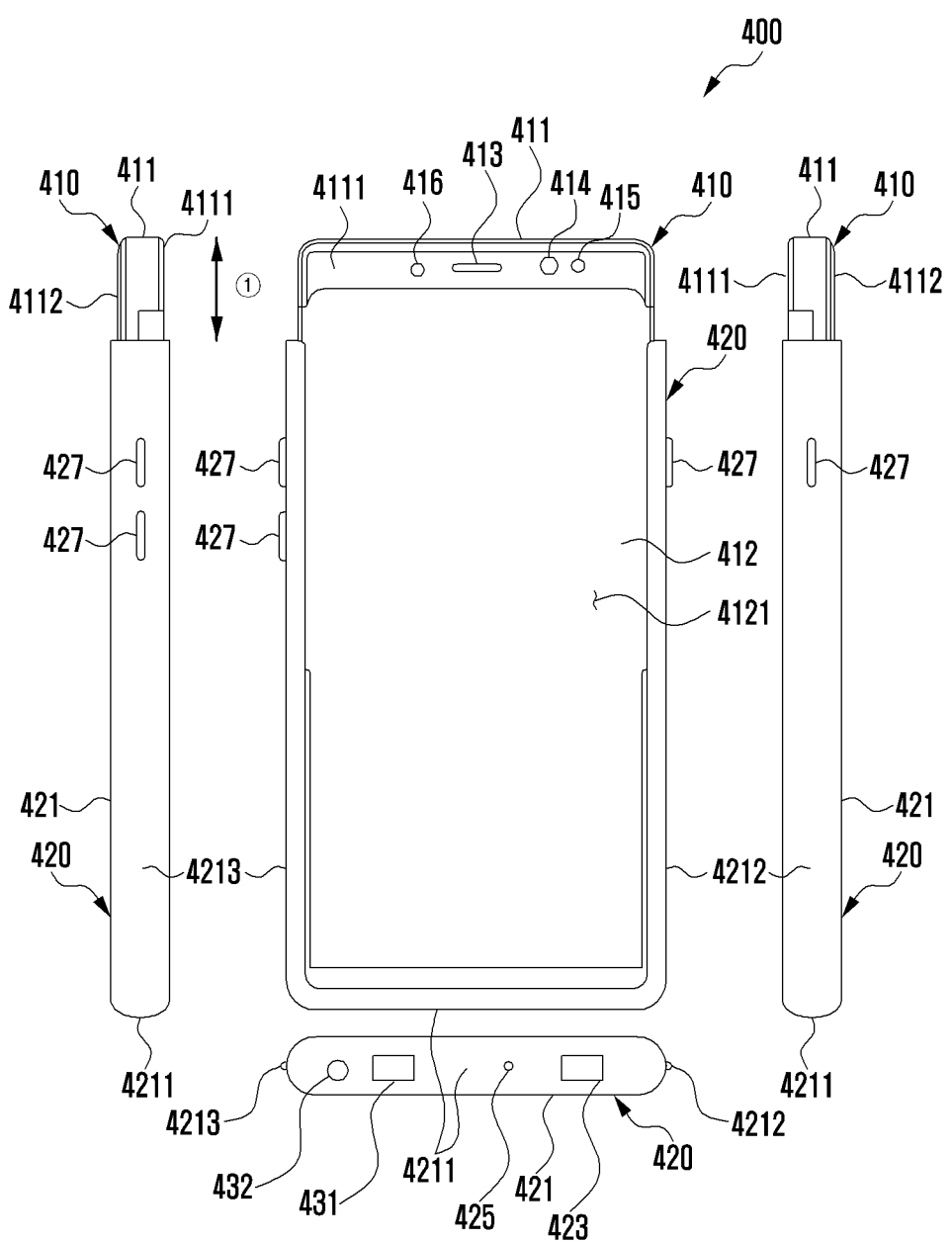
FIG. 4A and FIG. 4B are views illustrating closed and open states of an electronic device according to certain embodiments.
Figure 4B:
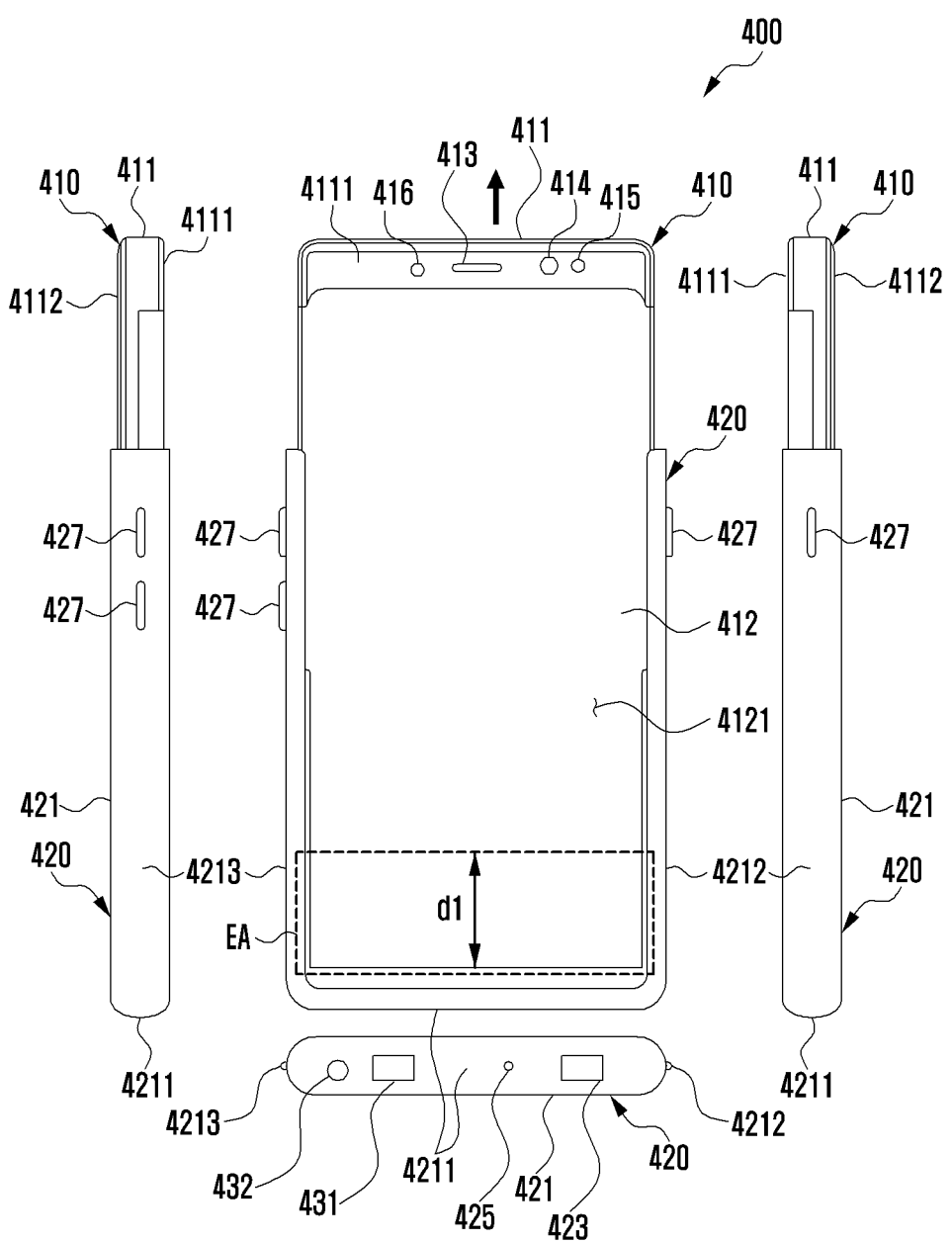
Figure 4C:
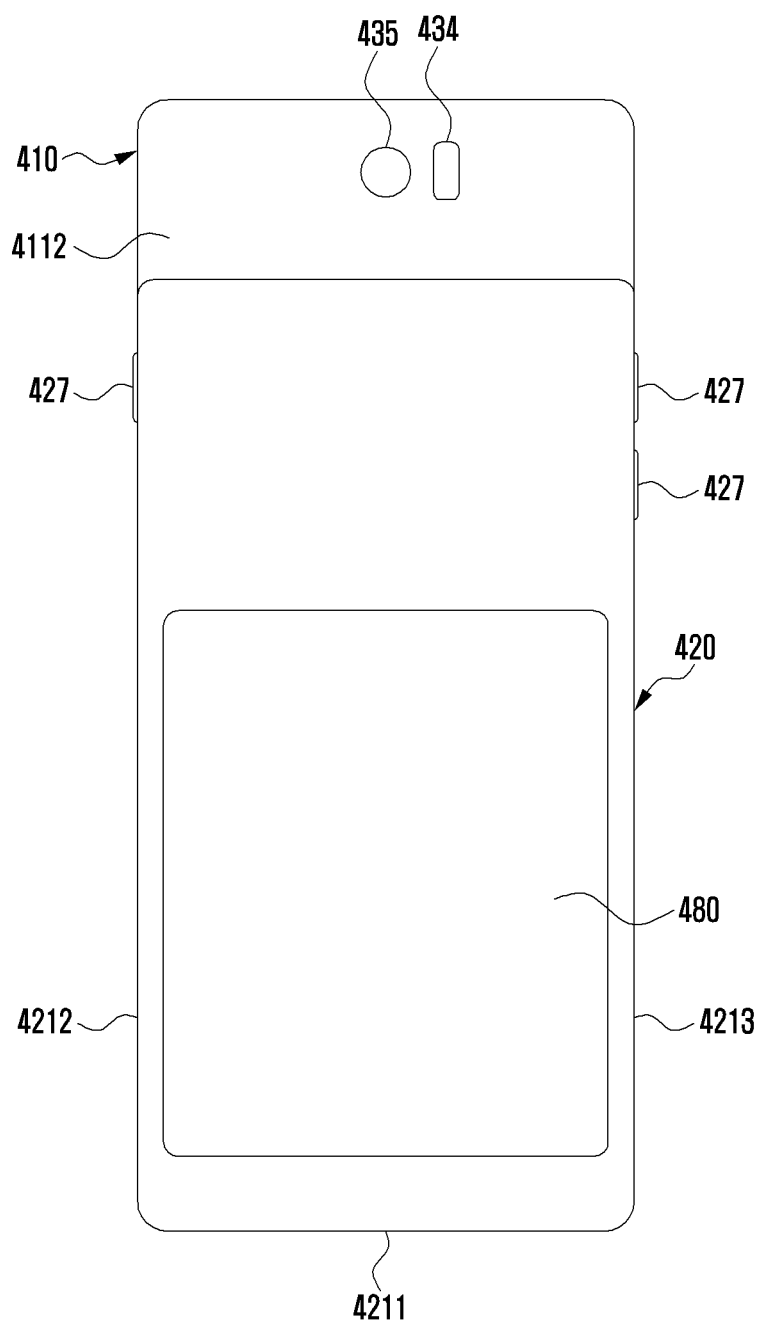
FIG. 4C is a perspective view illustrating a rear side of the electronic device according to certain embodiments.

FIGS. 4A and 4B are views 400 illustrating closed and open states of an electronic device according to certain embodiments. FIG. 4C is a perspective view illustrating the rear side of the electronic device according to certain embodiments.

FIG. 4A illustrates the state in which a first structure 410 is closed with respect to a second structure 420 and FIG. 4B illustrates the state in which the first structure 410 is opened with respect to the second structure 420.

Referring to FIGS. 4A, 4B, and 4C, an electronic device 400 (e.g., the electronic device 310 in FIG. 3) may include the first structure 410 and the second structure 420 movably disposed on the first structure 410.

According to an embodiment, the first structure 410 may be disposed to be reciprocable by a predetermined distance dl in the illustrated direction with reference to the second structure 420.

According to certain embodiments, the first plate 411 of the first structure 410 may include a first face 4111 and a second face 4112 facing away from the first face 4111. According to an embodiment, the second structure 420 may include a second plate 421, a first sidewall 4211 extending from the second plate 421, a second sidewall 4212 extending from the first sidewall 4211 and the second plate 421, a third sidewall 4213 extending from the first sidewall 4211 and the second plate 421 in parallel to the second sidewall 4212, and a second rear plate 480 (e.g., a rear window). According to an embodiment, the second plate 421, the first sidewall 4211, the second sidewall 4212, and the third sidewall 4213 may be formed to open at one side so as to receive at least part of the first structure 410. According to an embodiment, the second sidewall 4212 or the third sidewall 4213 may be omitted. According to an embodiment, the second plate 421, the first sidewall 4211, the second sidewall 4212, and the third sidewall 4213 may be formed as an integrated structure. As another example, the second plate 421, the first sidewall 4211, the second sidewall 4212, and the third sidewall 4213 may be formed as separate structures and then coupled. According to an embodiment, the second rear plate 480 may cover at least part of the display 412.

According to an embodiment, the first structure 410 is movable to an open state or a closed state relative to the second structure 420 in a first direction (e.g., direction ①) parallel to the second plate 421 and the second sidewall 4212, so that the first structure 410 may be located at a first distance from the first sidewall 4211 in the closed state and at a second distance from the first sidewall 4211 from the first sidewall 4211 in the open state, in which the second distance is greater than the first distance.

According to an embodiment, the electronic device 400 may include at least one of a display 412 (e.g., the display 337 in FIG. 3), audio modules 413 and 423 (e.g., the audio module 170 in FIG. 1), camera modules 415 and 435 (see FIG. 4C) (e.g., the camera module 180 in FIG. 1), an indicator 416 (e.g., an LED device), sensor modules 414 and 434 (e.g., the sensor module 176 in FIG. 1), a key input device 427, and connector holes 431 and 432.

According to an embodiment, the display 412 may extend across at least part of the first face 4111, and may include a planar portion 4121 disposed on the first face 4111 and a bendable portion extending from the planar portion 4121 into a space between the first sidewall 4211 and the first structure 410 in the closed state. According to an embodiment, when viewed from above the first plate 411, when the first structure 410 is moved from the closed state to the open state, at least part of the bendable portion of the display 412 may be configured to move by a predetermined display region EA (a distance dl) toward the planar portion 4121 in order to form a substantially planar face between the planar portion 4121 and the first sidewall 4211. The display 412 may be coupled to or disposed adjacent to a touch-sensing circuit, a pressure sensor capable of measuring the touch intensity (pressure), and/or a digitizer that detects a stylus pen.

According to an embodiment, the audio modules 413, 423, and 425 may include speaker holes 413 and 423, or a microphone hole 425. The speaker holes 413 and 423 may include a receiver hole 413 or an external speaker hole 423. The microphone hole 425 may include a microphone disposed therein so as to acquire external sound, and in some embodiments, multiple microphones disposed therein so as to sense the direction of sound. In some embodiments, the speaker holes 413 and 423 and the microphone hole 425 may be implemented as a single hole, or a speaker free of speaker holes 413 and 423 (e.g., a piezo speaker) may be included. According to an embodiment, the receiver hole 413 may be disposed in the first structure 410, and the external speaker hole 423 or the microphone hole 425 may be disposed in the second structure 420. According to another embodiment, the external speaker hole 423 may be disposed in the second face 4112 of the first plate 411 or on a side face of the first structure 410. According to another embodiment, the microphone hole 425 may be disposed in a side face of the first structure 410.

According to an embodiment, the sensor modules 414 and 434 may generate an electrical signal or a data value corresponding to an internal operating state of the electronic device 400 or an external environmental condition. The sensor modules 414 and 434 may include, for example, a first sensor module 414 (e.g., a proximity sensor) disposed on the first face 4111 of the first plate 411, a second sensor module (not illustrated) (e.g., a fingerprint sensor) disposed on the second face 4112 of the first plate 411, and/or a third sensor module 434 (e.g., an HRM sensor). The electronic device 400 may further include at least one of sensors not illustrated in the drawings, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illuminance sensor.

According to an embodiment, the camera modules 415 and 435 may include a first camera device 415 disposed on the first face 4111 of the first plate 411 and a second camera device 435 disposed on the second face 4112. The first camera device 415 or the second camera device 435 may include one or more lenses, an image sensor, and/or an image signal processor. According to an embodiment, the second camera device 435 may be disposed on one face of the second structure 420.

According to an embodiment, the key input device 427 may be disposed on the second sidewall 4212 or the third sidewall 4213 of the second structure 420. The electronic device 400 may include a key input device (not shown) such as a home key button or a touch pad disposed around the home key button. According to another embodiment, at least part of the key input device 427 may be located in one region of the first structure 410.

According to an embodiment, the indicator 416 may be disposed on the first face 4111 of the first plate 411. The indicator 416 may include an LED as long as it can provide the state information of the electronic device 400 in an optical form, for example.

According to an embodiment, the connector holes 431 and 432 may include a first connector hole 431 capable of accommodating a connector (e.g., a USB connector) for transmitting/receiving power and/or data to/from an external electronic device, and/or a second connector hole 432 capable of accommodating a connector (e.g., an earphone jack) for transmitting/receiving an audio signal to/from an external electronic device. According to an embodiment, the first connector hole 431 or the second connector hole 432 may be disposed in the first sidewall 4211 of the second structure 420. According to another embodiment, the first connector hole 431 or the second connector hole 432 may be disposed in the first sidewall of the second structure 410.

Figure 5:
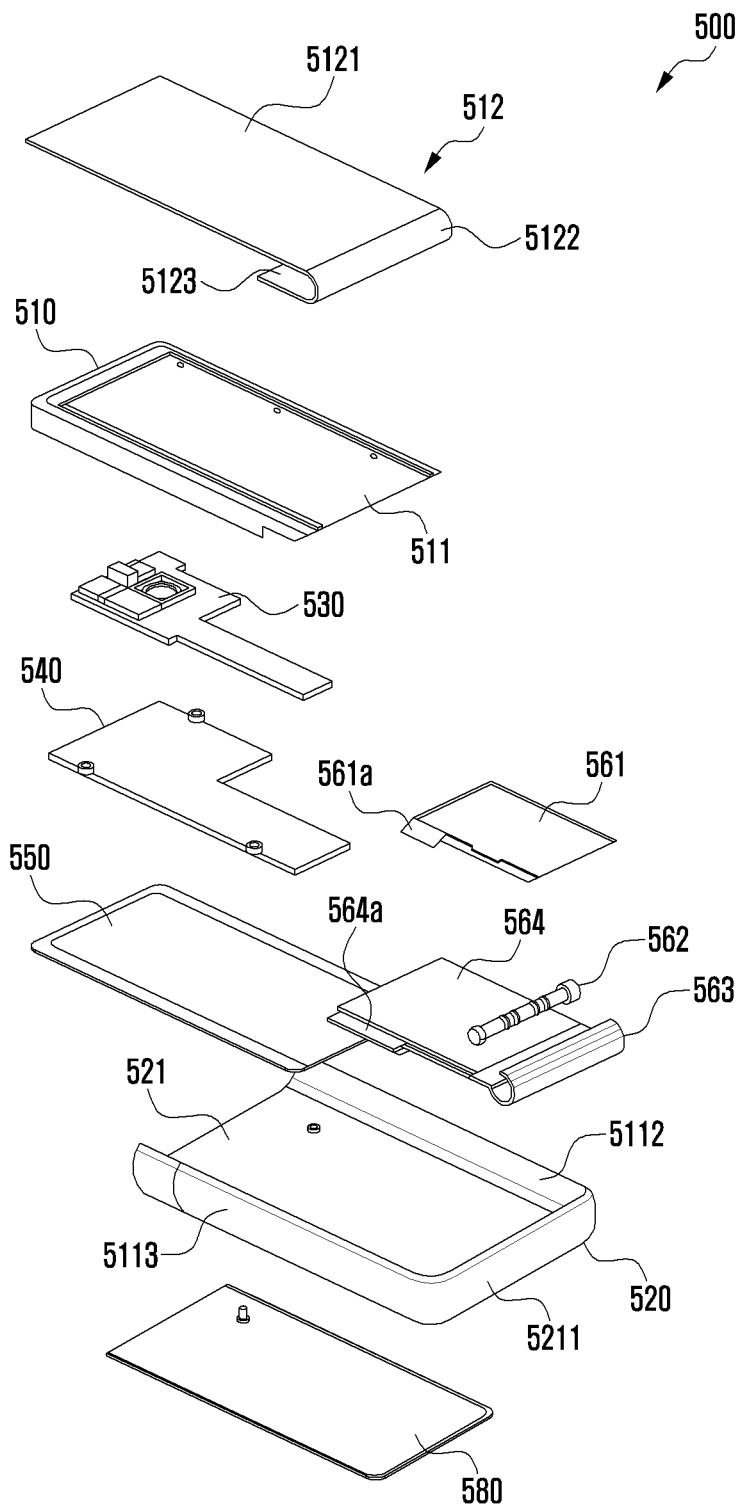
FIG. 5 is an exploded perspective view illustrating the electronic device according to certain embodiments.

FIG. 5 is an exploded perspective view illustrating the electronic device according to certain embodiments.

Referring to FIG. 5, an electronic device 500 (e.g., the electronic device 400 in FIGS. 4A to 4C) includes a display 512 (e.g., the display 412 in FIGS. 4A to 4C), a first structure 510 (e.g., the first structure 410 in FIGS. 4A to 4C), a first plate 511, a printed circuit board 530, a support member 540 (e.g., the rear case), a first hinge plate 561, a roller 562, a second hinge plate 564, a first rear plate 550, a second structure 520 (e.g., the second structure 420 in FIGS. 4A to 4C), a second plate 521 (e.g., the second plate 421 in FIGS. 4A and 4B), and a second rear plate 580 (e.g., the second rear plate 480 in FIGS. 4A to 4C) (e.g., a rear window). In some embodiments, in the electronic device 500, at least one of the components (e.g., the support member 540 or the first rear plate 550) may be omitted, or other components may be additionally included.

The display 512 may include a first face 5121 (e.g., the first face 4111 in FIGS. 4A and 4B), a second face 5122 (e.g., the second face 4112 in FIGS. 4A to 4C), and a third face 5123, and the display region of the screen may be changed based on the area exposed according to certain embodiments. The first face 5121 and the third face 5123 may form a planar face, and the second face 5122 may form a curved face. When the display 512 is in the position as shown in FIG. 4B, the second face 5122 straightens to be co-planar with the first face 5121.

The first structure 510 may include a first plate 511. The first structure 510 may be formed of, for example, a metal material and/or a non-metal (e.g., polymer) material. A display 512 may be coupled to one face of the first plate 511, and a printed circuit board 530 may be coupled to the other face of the first plate 511. The first plate 511 may be connected to one side of a multi-bar 563, which is at least connected to the second face 5122 of the display 512. The first structure 510 may fix the second hinge plate 564.

The first hinge plate 561 may support the multi-bar 563 when the display 512 is expanded. The first hinge plate 561 and the first hinge plate fixing portion 561a may be integrally formed. The first hinge plate fixing portion 561a may be connected to the second hinge plate fixing portion 564a of the second hinge plate 564.

The roller 562 may guide or support the multi-bar 563 such that the multi-bar 563 is movable in a predetermined radius. The roller 562 may be connected to the second hinge plate fixing portion 564a or the first hinge plate 561.

The multi-bar 563 may be formed of multiple straight bars. The multi-bar 563 may support at least part of the second face 5122 of the display 512. One side of the multi-bar 563 may be connected to the second hinge plate 564, and the other side may be connected to the first structure 510.

The second hinge plate 564 may support the third face 5123 of the display 512. The second hinge plate 564 may be moved so as to expand the screen in cooperation with the multi-bar 563 when the display 512 is expanded. The second hinge plate 564 may be formed as a component separate from the second hinge plate fixing portion 564a. The second hinge plate 564 may be fixed to the first structure 510 such that the second hinge plate 564 slides.

The second structure 520 may be formed to enclose at least part of the first structure 510, the second hinge plate 564, and the multi-bar 563. According to an embodiment, the second structure 520 may include a second plate 521, a first sidewall 5211 extending from the second plate 521, a second sidewall 5212 extending from the first sidewall 5211 and the second plate 521, and a third sidewall 5213 extending from the first sidewall 5211 and the second plate 521 in parallel to the second sidewall 5212. The second structure 520 may form a space that is capable of accommodating the configuration of the antenna in a space that does not overlap the multi-bar 563. The second structure 520 may include a second rear plate 580 that covers at least part of the third face 5123 of the display 512.

The second rear plate 580 may include a material that does not transmit light when it is not necessary to display information on the third face 5123 of the display 512. As another example, the second rear plate 580 may be formed of a material that transmits light so as to display information on the third face 5123 of the display 512. The second rear plate 580 may be formed integrally with the second structure 520.

The support member 540 may be disposed between the printed circuit board 530 and the first rear plate 550.

A processor (e.g., the processor 340 in FIG. 3), a memory (e.g., the memory 330 in FIG. 3), wireless communication module 192, power management module 188 and/or an interface (e.g., the interface 177 in FIG. 1) may be mounted on the printed circuit board 530. The processor may include one or more of, for example, a central processing unit, an application processor, a graphic processor, an image signal processor, a sensor hub processor, and a communication processor. The first structure 510 may be guided and moved through the first hinge plate 561 when the display 512 is expanded or contracted.

The memory may include, for example, a volatile memory or a non-volatile memory.

The interface may include, for example, an HDMI, a USB interface, an SD card interface, and/or an audio interface. The interface may electrically or physically connect, for example, the electronic device 500 to an external electronic device, and may include a USB connector, an SD card/an MMC connector, or an audio connector.

In an embodiment, an electronic device 500 (e.g., the electronic device 310 in FIG. 3) may include: a housing including a first plate 511, a second plate 521 spaced apart from the first plate 511 and facing away from the first plate 511, and a side member 5211 at least partially surrounding a space between the first plate 511 and the second plate 521; a touchscreen display 512 (e.g., the touchscreen display 335 in FIG. 3) including a first portion exposed through or mounted on at least part of the first plate 511, and a second portion extending from the first portion and wound to be bent into or to be bendable into the space such that the second portion is positioned or positionable between the first portion and the second plate 521; a conductive coil disposed in a space between the first portion and the second plate 521 or in a space between the first portion and the second portion in parallel to the second plate 521; a wireless charging circuit electrically connected to the conductive coil; a first shielding layer interposed between the conductive coil and at least part of the first portion of the touchscreen display 512; and a second shielding layer interposed between the second plate 521 and at least part of the second portion of the display 512.

In an embodiment, the conductive coil disposed between the first portion and the second plate 521 may be disposed to extend to at least a region of the space between the second portion and the second plate 521.

In an embodiment, the second shielding layer may be configured to extend from the first shielding layer.

In an embodiment, the second shielding layer may be configured to be separated from the first shielding layer.

In an embodiment, the length of the first shielding layer may be set to be longer than the length of the conductive coil.

In an embodiment, the first shielding layer and the second shielding layer may be made of at least one of graphite filler, alumina, ceramic, and carbon nanotubes depending on a characteristic of the conductive coil.

In an embodiment, the electronic device 500 may further include a first structure 510 including the first plate 511, and a second structure 520 including the second plate 521 and disposed to surround at least part of the first structure 510, and the first structure 510 may be disposed to be movable to an open state or a closed state with respect to the second structure 520 in a direction parallel to the second plate 521.

In an embodiment, the closed state may be a state in which the first structure 510 is located at a first distance from the side member 5211, and the open state may be a state in which the first structure 520 is located at a second distance from the side member 5211.

In an embodiment, the second distance may be greater than the first distance.

In an embodiment, the second structure 520 may include a rear plate 540 that covers at least part of the second portion.

In an embodiment, an electronic device 500 may include: a housing including a first plate 511, a second plate 521 spaced apart from the first plate 511 and facing away from the first plate 511, and a side member 5211 at least partially surrounding a space between the first plate 511 and the second plate 521; a touchscreen display 512 including a first portion exposed through or mounted on at least part of the first plate, and a second portion extending from the first portion and wound to be bent or bendable into the space such that the second portion is positioned or positionable between the first portion and the second plate 521; a conductive coil disposed in a space between the second portion and the second plate 521 or disposed in a space between the second portion and the second plate in parallel to the second plate; a wireless charging circuit electrically connected to the conductive coil; a memory; and at least one processor electrically connected to the housing, the touchscreen display 512, the conductive coil, the wireless charging circuit, and the memory. The at least one processor may be configured to deactivate at least part of the second portion of the touchscreen display 512 when the touchscreen display 512 is in an active state during reception of wireless power from the charging device (e.g., the charging device 350 in FIG. 3).

In an embodiment, the electronic device 500 may further include at least one switch line configured to deactivate at least part of the second portion of the touchscreen display 512.

In an embodiment, the touchscreen display 512 may include multiple pixels including an organic light-emitting diode.

In an embodiment, the at least one processor may turn off a light-emitting switching element by controlling a light-emitting signal supplied to the multiple pixels disposed in at least part of the second portion of the touchscreen display 512 when the touchscreen display 512 is in the active state.

In an embodiment, the at least one processor may maintain the inactive state of at least part of the second portion of the touchscreen display 512 when the touchscreen display 512 is not in the active state during the reception of the wireless power from the charging device.

In an embodiment, an electronic device 500 may include: a housing including a first plate 511, a second plate 521 spaced apart from the first plate 511 and facing away from the first plate 511, and a side member 5211 at least partially surrounding a space between the first plate 511 and the second plate 521; a touchscreen display 512 including a first portion exposed through or mounted on at least part of the first plate 511, and a second portion extending from the first portion and wound to be bent or bendable into the space such that the second portion is positioned or positionable between the first portion and the second plate 521; multiple conductive coils disposed in a space between the second portion and the second plate 521 or disposed in a space between the second portion and the second plate in parallel to the second plate; a wireless charging circuit electrically connected to the conductive coil; a memory; and at least one processor electrically connected to the housing, the touchscreen display 512, the multiple conductive coils, the wireless charging circuit, and the memory. The at least one processor may be configured to deactivate at least one conductive coil overlapping the second portion of the touchscreen display 512 among the multiple conductive coils when the touchscreen display 512 is in an active state during reception of wireless power from the charging device.

In an embodiment, the at least one processor may transmit information indicating the activated state of the touchscreen display 512 to the charging device via an activated conductive coil among the multiple conductive coils so as to deactivate a conductive coil of the charging device which corresponds to the at least one deactivated conductive coil.

In an embodiment, the electronic device 500 may further include a wireless communication circuit (e.g., the wireless communication circuit 315 in FIG. 3), and the at least one processor may transmit information indicating the activated state of the touchscreen display 512 to the charging device via the wireless communication circuit so as to deactivate a conductive coil of the charging device, which corresponds to the at least one conductive coil.

In an embodiment, the at least one processor may activate the at least one deactivated conductive coil when the touchscreen display 512 is switched to an inactive state.

In an embodiment, the at least one processor may transmit information indicating that the touchscreen display 512 has been switched into the in active state to the charging device via an activated conductive coil among the multiple conductive coils so as to activate a conductive coil of the charging device which corresponds to the at least one activated conductive coil.

In an embodiment, the at least one processor may transmit information indicating that the touchscreen display 512 has been switched into the in active state to the charging device via the wireless communication circuit so as to activate a conductive coil of the charging device which corresponds to the at least one activated conductive coil.

In an embodiment, the at least one processor may maintain the active state of at least one conductive coil overlapping the second portion of the touchscreen display 512 when the touchscreen display 512 is not in the active state during the reception of the wireless power from the charging device.

FIGS. 6A to 6D are views 600 for describing a structure in which a coil for wireless charging is disposed in an electronic device according to certain embodiments.

In an embodiment, a display 610 (e.g., the display 512 in FIG. 5) of an electronic device 601 (e.g., the electronic device 310 in FIG. 3) may be a flexible display.

In an embodiment, the electronic device 601 may include components, at least some or all of which are the same as those of the electronic device 310 of FIG. 3.

In an embodiment, the display 610 may extend to at least one side face of the electronic device 601, e.g., to the lower side and may be bent in a curvature radius equal to or smaller than an operable curvature radius to be fastened to the side face of the electronic device 601.

Figure 6A:
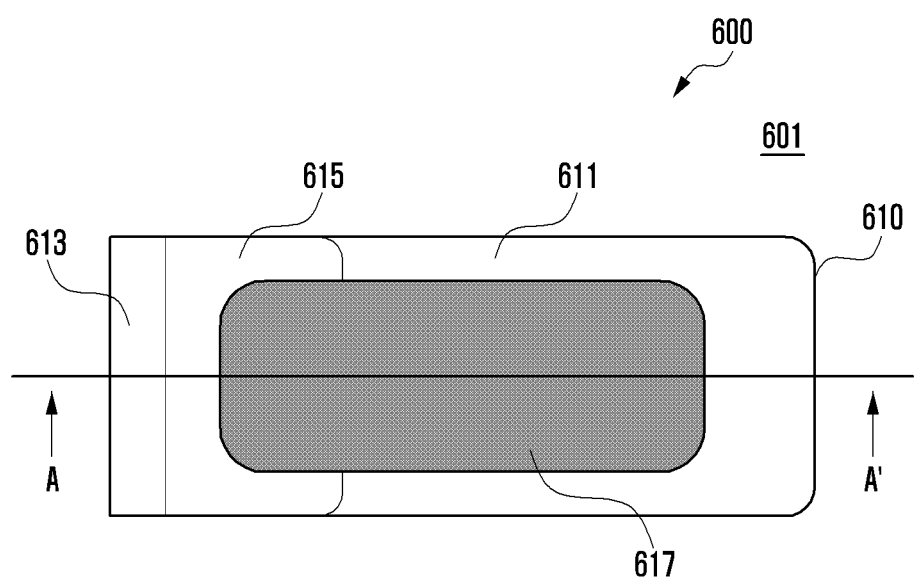
FIG. 6A, FIG. 6B, FIG. 6C and FIG. 6D are views for describing a structure in which a coil for wireless charging is disposed in an electronic device according to certain embodiments.

Referring to FIG. 6A, the display 610 of the electronic device 601 may include a first face 611 (e.g., the first face 5121 in FIG. 5), a second face 613 (e.g., the second face 5122 in FIG. 5), and a third face 615 (e.g., the third face 5123 in FIG. 5). The third face 615 is below the first face 611. In an embodiment, the first face 611 and the third face 615 may form a planar face, and the second face 613 may form a bent face.

In an embodiment, the electronic device 601 may include a reception coil (Rx coil) 617 for receiving wireless power from an external electronic device (e.g., the charging device 350 in FIG. 3) in order to charge a battery (e.g., the battery 325 in FIG. 3).

Figure 6B:
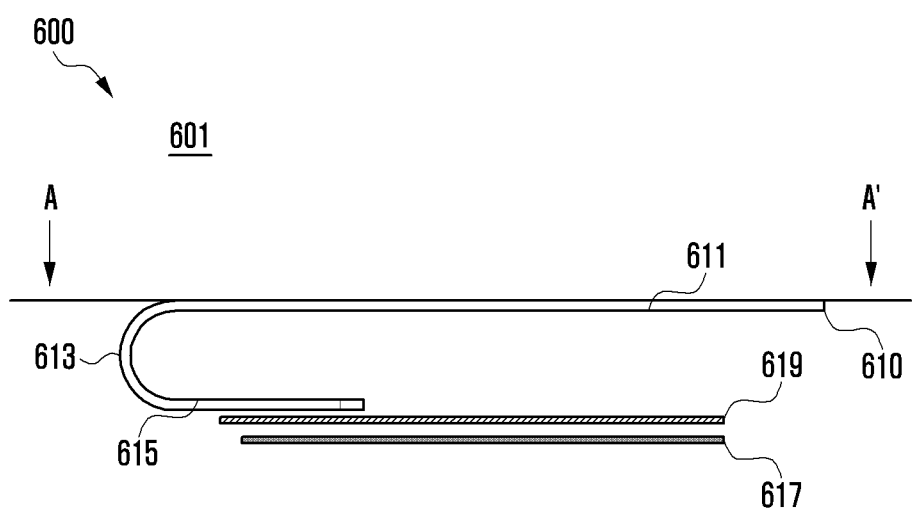

Referring to FIG. 6B, FIG. 6B schematically illustrates a cross-sectional view of the display 610 cut in the A-A' direction.

In an embodiment, the first face 611 of the display 610 may be oriented in a first direction and the third face 615 of the display 610 may face away from the first direction. For example, the reception coil 617 for receiving wireless power may be provided at the lower end of the third face 615 oriented in a direction opposite the first direction in parallel to the third face 615 when viewed from above the first face 611 of the display 610. For example, the reception coil 617 may be disposed to overlap at least part of the third face 615 of the display 610.

In an embodiment, the electronic device 601 may further include a shielding layer 619 configured to prevent loss of the magnetic field generated in the reception coil 617 and to protect internal elements (e.g., the processor 340, the memory 330, and the wireless communication circuit 315 in FIG. 3).

In an embodiment, the shielding layer 619 may be disposed in a space between the reception coil 617 and the third face 615 of the display 610, which is oriented in a direction opposite the first direction.

In an embodiment, the electronic device 601 having coils disposed as in FIGS. 6A and 6B may output information through the first face 611, the second face 613, and the third face 615 of the display 610.

In an embodiment, the electronic device 601 having coils disposed as in FIGS. 6A and 6B may output information through the first face 611 and the second face 613 of the display 610. The third face 615 of the display 610 may be a region in which no information is output.

Figure 6C:
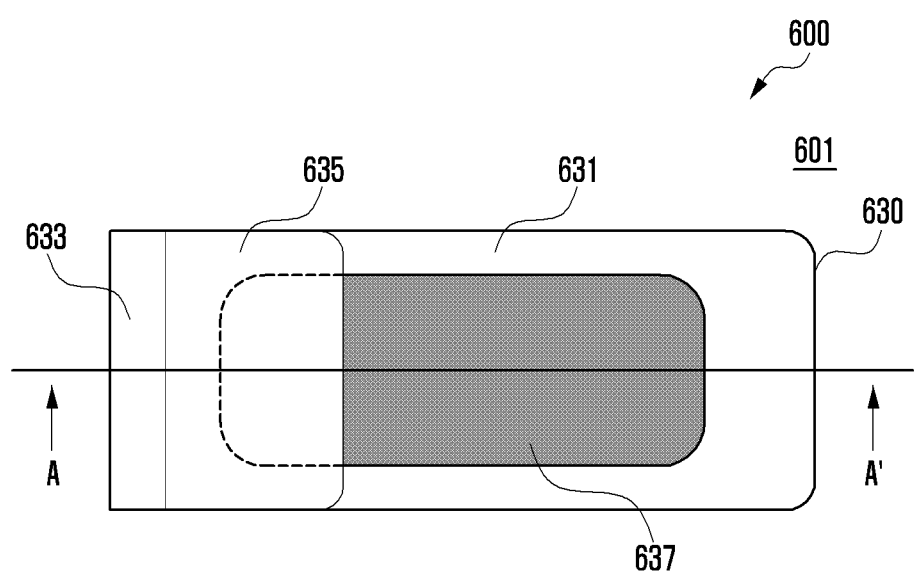

Referring to FIG. 6C, the display 630 of the electronic device 601 may be constituted with a flexible display, and may include a first face 631 and a third face 635 formed in planar faces, and a second face 633 formed in a curved face as in FIG. 6A.

In an embodiment, the electronic device 601 may include a reception coil (Rx coil) 637 for receiving wireless power from the charging device for charging the battery.

Figure 6D:
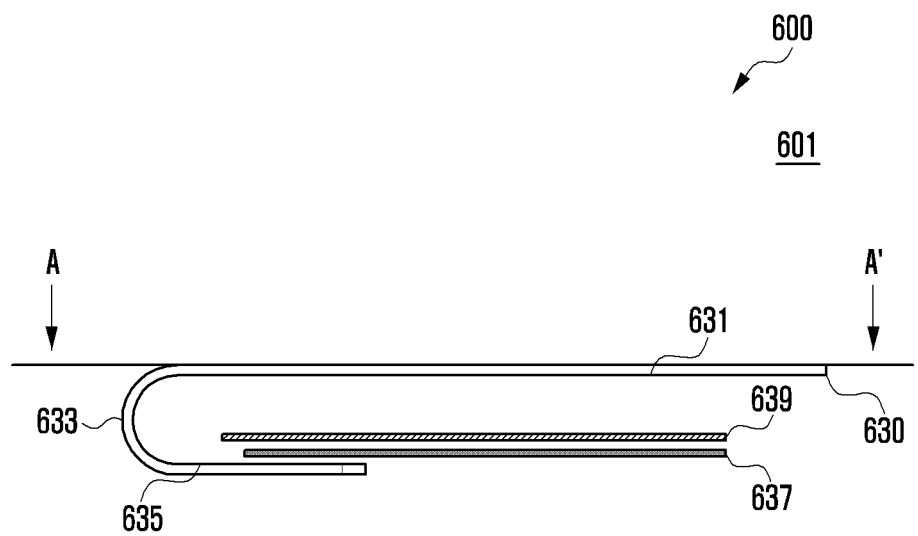

Referring to FIG. 6D, FIG. 6D schematically illustrates a cross-sectional view of the display 630 cut in the A-A' direction.

In an embodiment, the first face 631 of the display 630 may be oriented in a first direction and the third face 635 of the display 630 may face away from the first direction. For example, the reception coil 637 for receiving wireless power may be disposed in the space between the first face 631 and the third face 635 of the display panel 630 in parallel to the third face 635. For example, the reception coil 637 may be disposed to overlap at least part of the third face 635 of the display 630.

In an embodiment, the electronic device 601 may further include a shielding layer 639 configured to prevent loss of the magnetic field generated in the reception coil 637 and to protect internal elements (e.g., the processor 340, the memory 330, and the wireless communication circuit 315 in FIG. 3).

In an embodiment, the shielding layer 639 may be disposed in a space between the reception coil 637 and the first face 631 of the display 630.

In an embodiment, the electronic device 601 having coils disposed as in FIGS. 6C and 6D may output information through the first face 631, the second face 633, and the third face 635 of the display 630.

Figure 7A:
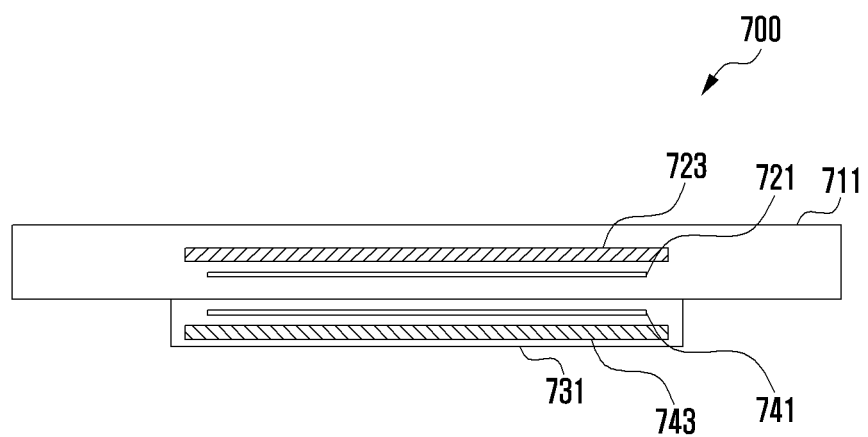
FIG. 7A and FIG. 7B are views for describing a flow of magnetic fields during wireless charging according to certain embodiments.
Figure 7B:
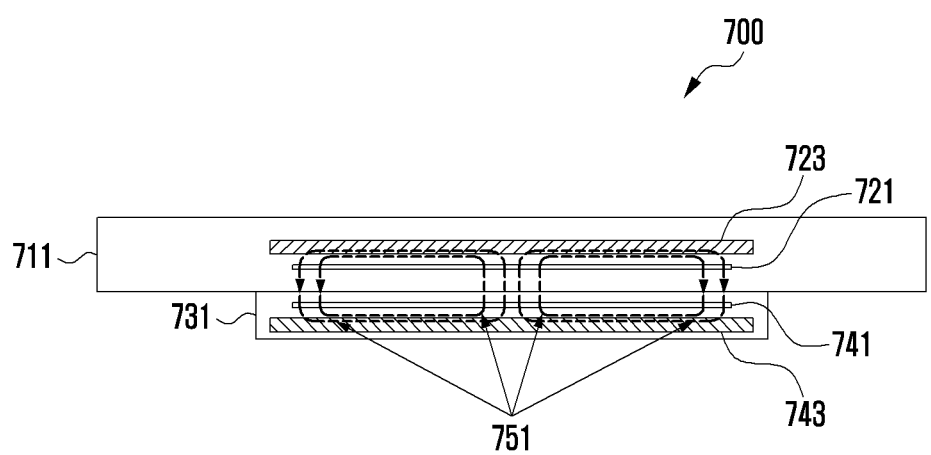

FIGS. 7A and 7B are views 700 for describing a flow of magnetic fields during wireless charging according to certain embodiments.

Referring to FIG. 7A, an electronic device 711 (e.g., the electronic device 310 in FIG. 3) may include a reception coil 721 (Rx coil) (e.g., the reception coils 617 and 637 in FIGS. 6A to 6D) configured to receive wireless power for charging a battery (e.g., the battery 325 in FIG. 3) from a charging device 731 (e.g., the charging device 350 in FIG. 3).

In an embodiment, the electronic device 711 may further include a shielding layer 723 (e.g., the shielding layers 619 and 639 in FIGS. 6A to 6D) to prevent the loss of magnetic fields generated in the reception coil 721 during wireless charging. The reception coil shielding layer 723 may be disposed at the upper end of the reception coil 721 with a length longer than that of the reception coil 721.

In an embodiment, the charging device 731 may include a transmission coil (Tx coil) 741 configured to transmit wireless power for charging the battery to the electronic device 711. The charging device 731 may further include a shielding layer 743 configured to prevent the loss of magnetic fields generated in the transmission coil 741 during wireless charging. The transmission coil shielding layer 743 may be disposed at the lower end of the transmission coil 741 with a length longer than that of the transmission coil 741.

In an embodiment, the electronic device 711 may receive the wireless power transmitted via the transmission coil 741 of the charging device 731 via the reception coil 721 to charge the battery. In this case, since the reception coil shielding layer 723 and the transmission coil shielding layer 743 are provided as illustrated in FIG. 7B, magnetic fields 751 generated by the reception coil 721 and the transmission coil 741 may be generated within the range of the reception coil 721 and the transmission coil 741.

In certain embodiments, power consumption can be reduced, excessive heat generation, and distortion to the display can be avoided. For example, if the battery is charged using wireless power received from the charging device 731, the reception coil 721 disposed in the electronic device 711 and the reception coil 721 disposed in the charging device 731 are erroneously aligned (e.g., the state in which the reception coil 721 and the transmission coil 741 are arranged so as to overlap each other by a predetermined area or less in the vertical direction), the supply power of the transmission coil 741 disposed in the charging device 731 may rise excessively, and excessive heat may be generated. In addition, as the reception coil 721 and the transmission coil 741 are erroneously aligned, the wireless charging efficiency may be reduced. When the reception coil 721 and the transmission coil 741 are erroneously aligned, at least part of the rear face of the activated display (e.g., the third face 5123 in FIG. 5) may be distorted by the magnetic fields generated outside the range of the reception coil 721 and the transmission coil 741. The phenomenon in which at least a portion of the rear face of the display is distorted may be transferred to the front face of the display (e.g., the first face 5121 in FIG. 5). Accordingly, the front face of the display may also be distorted.

According to certain embodiments described below, it is possible to reduce the phenomenon in which the front face of the display in the active state is distorted during wireless charging.

Figure 8A:
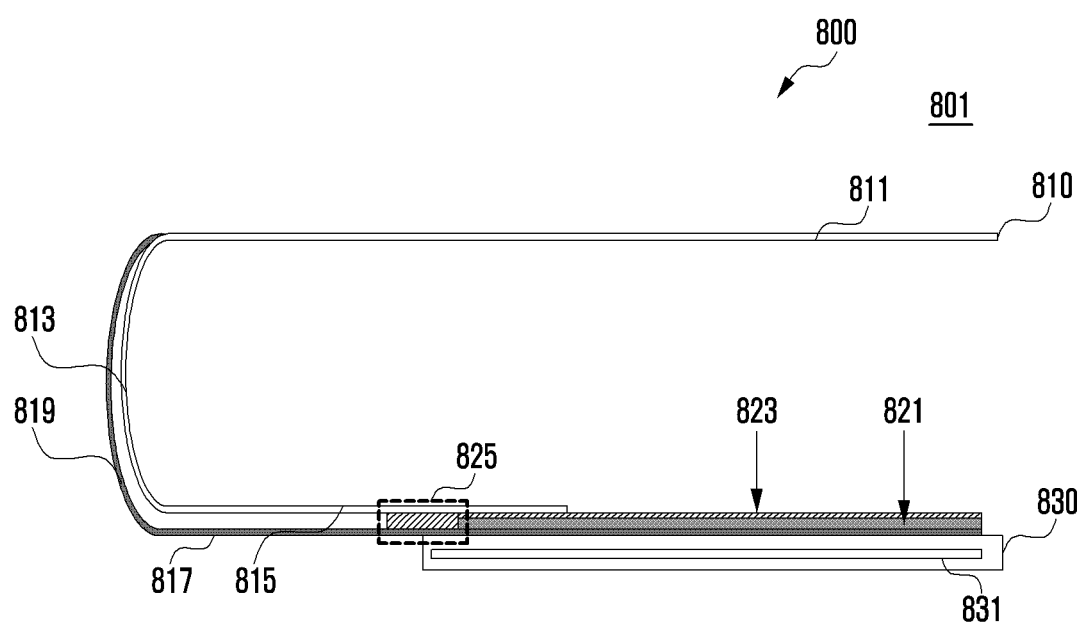
FIG. 8A and FIG. 8B are views for describing a wireless charging method of an electronic device including a flexible display according to an embodiment.
Figure 8B:
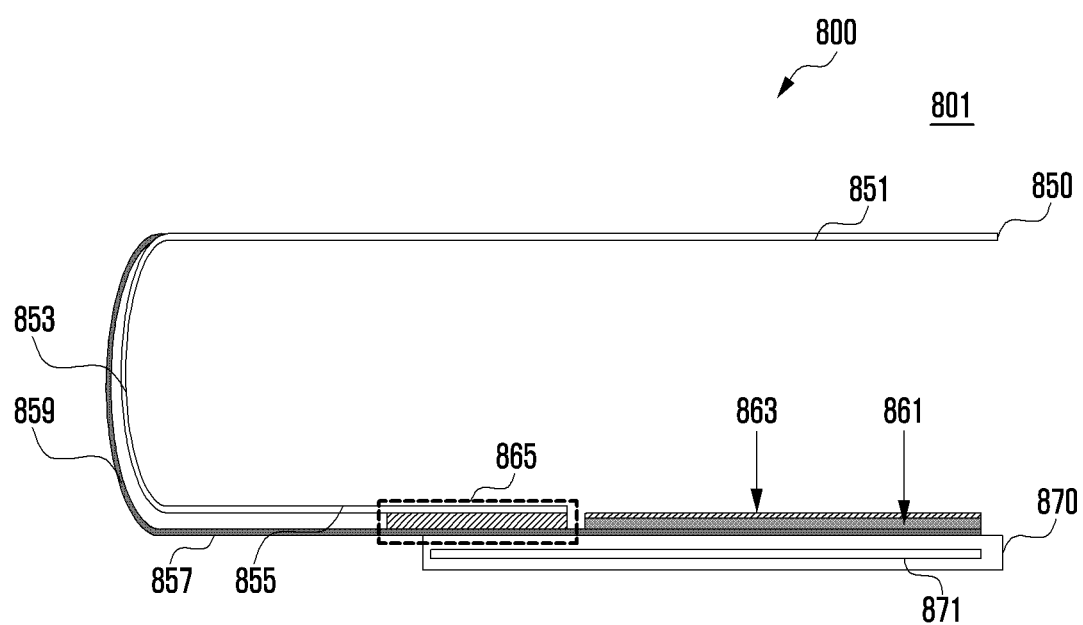

FIGS. 8A and 8B are views 800 for describing a wireless charging method of an electronic device including a flexible display according to an embodiment.

Referring to FIG. 8A, a display 810 (e.g., the display 512 in FIG. 5) of an electronic device 801 (e.g., the electronic device 310 in FIG. 3) may be a flexible display, and may include a first face 811 (e.g., the first face 5121 in FIG. 5), a second face 813 (e.g., the second face 5122 in FIG. 5), and a third face 815 (e.g., the third face 5123 in FIG. 5). In an embodiment, the first face 811 and the third face 815 may form a planar face, and the second face 813 may form a bent face.

In an embodiment, the electronic device 801 may include a housing, which may include a first plate oriented in a first direction and a second plate 817 (e.g., the second plate 521 in FIG. 5) spaced apart from the first plate and oriented in a second direction opposite the first direction to face away from the first plate.

In an embodiment, the electronic device 801 may include a side member 819 (e.g., the first sidewall 5211 in FIG. 5) that at least partially surrounds the space between the first plate and the second plate 817.

In an embodiment, the display 810 may be coupled to one face of the first plate.

In an embodiment, the electronic device 801 may include a reception coil (Rx coil) 821 (e.g., the reception coil 721 in FIGS. 7A and 7B) that receives wireless power for charging via a charging device 830 (e.g., the charging device 350 in FIG. 3). The reception coil 821 may be disposed between at least part of the first face 811 of the display 810 and the second plate 817.

In an embodiment, the reception coil 821 may be disposed between the second plate 817 and at least part of the third face 815 of the display 810.

In an embodiment, a first shielding layer 823 may be disposed in the space between at least part of the third face 815 of the display 810 and the reception coil 821 to prevent the loss of magnetic fields generated in the reception coil 821.

In an embodiment, the electronic device 801 may further include a second shielding layer 825. For example, the second shielding layer 825 may extend from the first shielding layer 823 to be disposed in the space between at least part of the third face 815 of the display 810 and the second plate 817.

In an embodiment, the first shielding layer 823 and the second shielding layer 825 may be made of at least one of graphite filler, alumina, ceramic, and carbon nanotubes depending on the characteristic of the conductive coil.

In an embodiment, since the second shielding layer 825 extending from the first shielding layer 823 is further disposed, distortion is prevented from occurring on the third face 815 of the display 810, which is in the activated state during wireless charging, even if the length of the reception coil 821 disposed in the electronic device 801 and the length of the transmission coil 831 (e.g., the transmission coil 741 in FIGS. 7A and 7B) disposed in the charging device 830 are different from each other or the reception coil 824 and the transmission coil 831 are partially misaligned. Since the distortion is prevented from occurring on the third face 815 of the display 810, it is also possible to prevent the occurrence of a phenomenon in which the first face 811, which is the front face of the display 810, is distorted.

Referring to FIG. 8B, the display 850 of the electronic device 801 may be constituted with a flexible display, and may include a first face 851, a second face 853, and a third face 855 as in FIG. 8A. In an embodiment, the first face 851 and the third face 855 may form a planar face, and the second face 853 may form a bent face.

In an embodiment, the electronic device 801 may include a first plate oriented in a first direction, a second plate 857 (e.g., the second plate 521 in FIG. 5) spaced apart from the first plate and oriented in a second direction opposite the first direction to face away from the first plate.

In an embodiment, the electronic device 801 may include a side member 859 (e.g., the first sidewall 5211 in FIG. 5) that at least partially surrounds the space between the first plate and the second plate.

In an embodiment, the display 850 may be coupled to one face of the first plate.

In an embodiment, the electronic device 801 may include a reception coil (Rx coil) 861 that receives wireless power for charging (e.g., the reception coil 821 in FIG. 8A) via a charging device 870. The reception coil 861 may be disposed between at least part of the first face 851 of the display 850 and the second plate 857.

In an embodiment, a first shielding layer 863 may be disposed in the space between at least part of the first face 851 of the display 850 and the reception coil 861 to prevent the loss of magnetic fields generated in the reception coil 821.

In an embodiment, the electronic device 801 may further include a second shielding layer 865 separately from the first shielding layer 863. For example, the reception coil 865 may be disposed between at least part of the third face 855 of the display 850 and the second plate 857.

In an embodiment, since the second shielding layer 865 is disposed in the space between at least part of the third face 855 of the display 850 and the second plate 857, distortion is prevented from occurring on the third face 855 of the display 850, which is activated during wireless charging, even if the length of the reception coil 861 disposed in the electronic device 801 and the transmission coil 871 (the transmission coil 831 in FIG. 8A) disposed in the charging device are different from each other or the reception coil 821 and the transmission coil 831 are partially misaligned. Since the distortion phenomenon does not occur on the third face 855 of the display 850, it is possible to prevent the occurrence of distortion on the first face 851 of the display 850.

In an embodiment, a charging device 830 or 870 may include a first portion in contact with the second plate 817 or 857 of the electronic device 801 and a second portion spaced apart from the first portion and facing away from the first portion.

Although a transmission coil shielding layer is not illustrated in FIGS. 8A and 8B described above, the transmission coil shielding layer may be disposed in the space formed between the second portion of the charging device 830 or 870 and the transmission coil 831 or 871 to be spaced apart from the transmission coil 831 or 871 by a predetermined distance.

Figure 9:
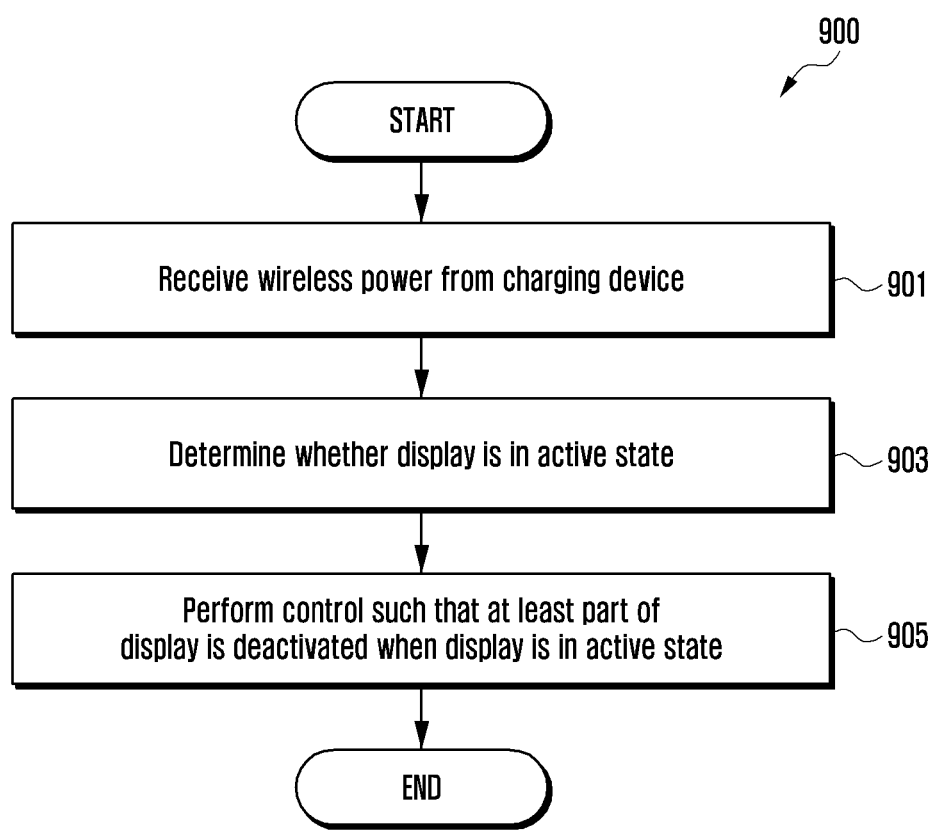
FIG. 9 is a flowchart for describing a wireless charging method of an electronic device including a flexible display according to an embodiment.

FIG. 9 is a flowchart 900 for describing a wireless charging method of an electronic device including a flexible display according to an embodiment.

Referring to FIG. 9, according to an embodiment, in operation 901, an electronic device (e.g., the electronic device 310 in FIG. 3) may receive wireless power from a charging device (e.g., the charging device 350 in FIG. 3). For example, a power reception unit (e.g., the power reception unit 320 in FIG. 3) of an electronic device 310 may receive, via a reception coil (e.g., the reception coil 821 or 861 in FIGS. 8A and 8B), wireless power transmitted by a transmission coil (e.g., the transmission coil 831 or 871 in FIGS. 8A and 8B) of the charging device 350 to charge a battery (e.g., the battery 325 in FIG. 3).

According to an embodiment, in operation 903, the electronic device 310 may determine whether a display (e.g., the display 337 in FIG. 3) is in an active state. For example, during the charging of the battery 325 using the wireless power received from the transmission coil of the charging device 350 via the power reception unit 320, the electronic device 310 (e.g., the processor 340) may determine whether a display (e.g., the display 337 in FIG. 3) is in an active state.

According to an embodiment, in operation 905, the electronic device 310 may perform control such that at least part of the display 337 is deactivated when the display 337 is in the active state. For example, the electronic device 310 (e.g., the processor 340) may perform control such that at least part of the display 337, which overlaps at least one of a reception coil of the electronic device 310 and a transmission coil of the charging device 350, is deactivated.

According to an embodiment, when it is determined that the display 337 is in the inactive state in operation 903, operation 905 described above may be omitted.

Figure 10A:
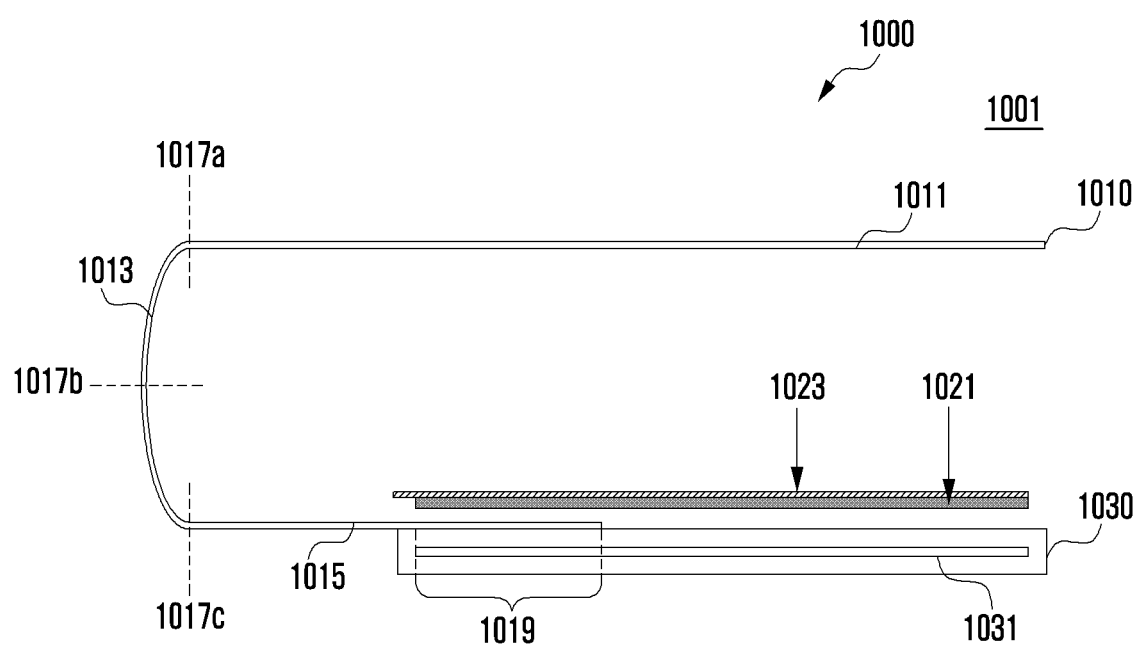
FIG. 10A and FIG. 10B are views for describing a wireless charging method of an electronic device including a flexible display according to an embodiment.
Figure 10B:
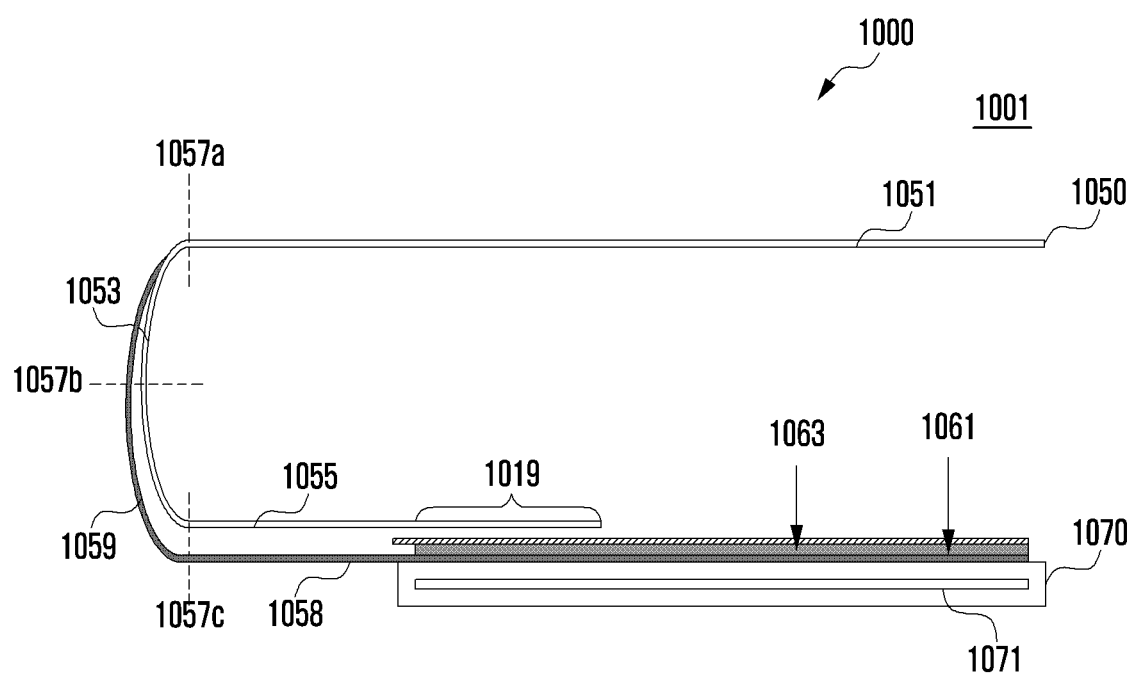

FIGS. 10A and 10B are views 1000 for describing a wireless charging method of an electronic device including a flexible display according to an embodiment.

Referring to FIG. 10A, a display 1010 (e.g., the display 337 in FIG. 3) of an electronic device 1001 (e.g., the electronic device 310 in FIG. 3) may be constituted with a flexible display, and may include a first face 1011 (e.g., the first face 5121 in FIG. 5) and a third face 1015 (e.g., the third face 5123 in FIG. 5), which are formed in planar faces, and a second face 1013 (e.g., the second face 5122 in FIG. 5), which is formed in a curved face.

In an embodiment, the electronic device 1001 may have the structure illustrated above with reference to FIGS. 6C and 6D. For example, the reception coil 1021 may be disposed in the space between the first face 1011 and the third face 1015 of the display 1010 in parallel to the third face 1015.

In an embodiment, the shielding layer 1023 may be disposed in the space between the first face 1011 of the display 1010 and the reception coil 1021 to prevent loss of magnetic fields generated in the reception coil 1021.

In an embodiment, the electronic device 1001 may deactivate at least part of the display 1010 when the display 1010 is in the active state during wireless charging. For example, the at least part of the deactivated display 1010 may be a region 1019 overlapping at least one of the reception coil 1021, which is disposed in the electronic device 1001, and the transmission coil 1031, which is disposed in the charging device 1030 (e.g., the charging device 350 in FIG. 3).

In an embodiment, the electronic device 1001 may deactivate at least part (e.g., at least one of the first face 1011, the second face 1013, and the third face 1015) of the display 1010 depending on a first reference point 1017a, a second reference point 1017b, or a third reference point 1017c. For example, when the display 1010 is activated during wireless charging, the electronic device 1001 may deactivate at least part of the display 1010 including a region 1019 overlapping the transmission coil 1031 (although the regions 1019 that overlap the transmission coil and the reception coil are the same, it is noted that in certain embodiments, the regions may be different) of the charging device 1030 depending on the third reference point 1017c.

In an embodiment, the reference points for deactivating at least part of the display 1010 are described as the first to third reference points 1017a, 1017b, and 1017c, but the disclosure is not limited thereto.

Referring to FIG. 10B, the display 1050 of the electronic device 1001 may be constituted with a flexible display, and may include a first face 1051 and a third face 1055, which are formed in planar faces, and a second face 1053, which is formed in a curved face as in FIG. 10A.

In an embodiment, the electronic device 1001 may include a first plate oriented in a first direction, a second plate 1058 (e.g., the second plate 521 in FIG. 5) spaced apart from the first plate and oriented in a second direction opposite the first direction to face away from the first plate.

In an embodiment, the electronic device 1001 may include a side member 1059 (e.g., the first sidewall 5211 in FIG. 5) that at least partially surrounds the space between the first plate and the second plate 1058.

In an embodiment, the display 1010 may be coupled to one face of the first plate.

In an embodiment, the electronic device 1001 may have the structure illustrated above with reference to FIGS. 6A and 6B. For example, the reception coil 1061 may be disposed in the space between at least part of the third face 1055 of the display 1050 and the second plate 1058 in parallel to the third face 1055.

In an embodiment, the shielding layer 1063 may be disposed between the reception coil 1061 and the third face 1055 of the display 1050 in order to prevent loss of magnetic fields generated in the reception coil 1061.

In an embodiment, the electronic device 1001 may deactivate at least part of the display 1050 (e.g., the first face 1051, the second face 1053, and the third face 1055) when the display 1050 is in the active state during wireless charging. For example, the at least part of the deactivated display 1050 may be a region 1019 overlapping at least one of the reception coil 1061, which is disposed in the electronic device 1001, and the transmission coil 1071, which is disposed in the charging device 1070.

In an embodiment, the electronic device 1001 may deactivate at least part of the display 1050 depending on a first reference point 1057a, a second reference point 1057b, or a third reference point 1057c.

In the embodiment of FIGS. 10A and 10B, since at least part 1019 of the display 1050, which overlaps at least one of the reception coil 1021 or 1061 and the transmission coil 1031 or 1071 (e.g., at least part of the third face 1015 or 1055 of the display 1010 or 1050), is deactivated, it is possible to prevent the occurrence of a phenomenon in which the display 1010 or 1050 is distorted by magnetic fields.

In an embodiment, since it is not necessary to utilize the display in contact with the charging device during wireless charging, there may be no inconvenience in using the display by the user.

Figure 11A:
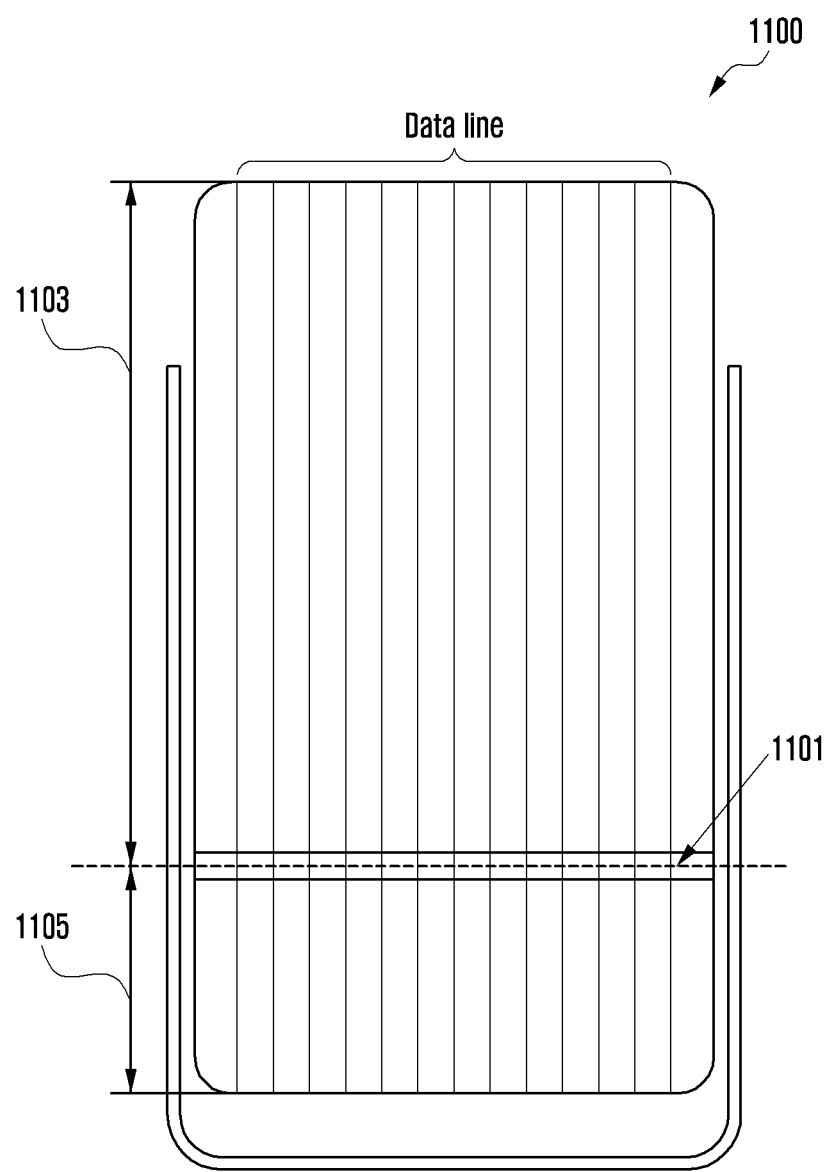
FIG. 11A is a view for describing a method of deactivating at least part of a flexible display depending on a reference point according to an embodiment.

FIG. 11A is a view 1100 for describing a method of deactivating at least part of a flexible display depending on a reference point according to an embodiment.

Referring to FIG. 11A, the drawing 1100 is a front perspective view of a display (e.g., the display 337 in FIG. 3).

In an embodiment, a display (e.g., the display 512 in FIG. 5) may include multiple data lines and multiple gate lines (not illustrated) intersecting each other, and pixels formed at the intersections of the data lines and gate lines. Each pixel may include an organic light-emitting diode (OLED) and a pixel-driving circuit for driving the organic light-emitting diode.

In an embodiment, the display may be constituted with a flexible display, and may include a first face (e.g., the first face 5121 in FIG. 5) and a third face (e.g., the third face 5123 in FIG. 5), which are formed in planar faces, and a second face (e.g., the second face 5122 in FIG. 5), which is formed in a bendable face. For example, descriptions will be made assuming that reference numeral 1103 denotes a first face and a second face, which are the front and side faces of the display, and reference numeral 1105 denotes a third face, which is the rear face of the display.

In an embodiment, the electronic device may further include a switch line 1101 configured to perform such that at least part of the display is deactivated when the display is in the active state during wireless charging.

In an embodiment, the switch line 1101 may be added to a driving circuit of a pixel corresponding to at least one of the first reference point 1017a or 1057a, the second reference point 1017b or 1057b, and the third reference point 1017c or 1057c in FIGS. 10A and 10B described above.

In the embodiment of FIG. 11A, descriptions will be made assuming that the switch line 1101 is added to the driving circuit of the pixel corresponding to the third reference point (e.g., the third reference point 1017c or 1057c in FIGS. 10A and 10B).

In an embodiment, when the display is active during wireless charging, the electronic device may control the switch line 1101 to deactivate the region 1105 of the third face, which is the rear face of the display. For example, an off-voltage may be supplied only to the region 1105 of the third face via the switch line 1101 so as to turn off the driving thin film transistor connected to the light-emitting signal line.

In an embodiment, in the case in which the first structure 410 is in a closed state with respect to the second structure 420 as in FIG. 4A, when the display is in the active state during wireless charging, it is possible to deactivate only the region 1105 of the third face, which is the rear face of the display, according to the embodiment of FIG. 11A.

Figure 11B:
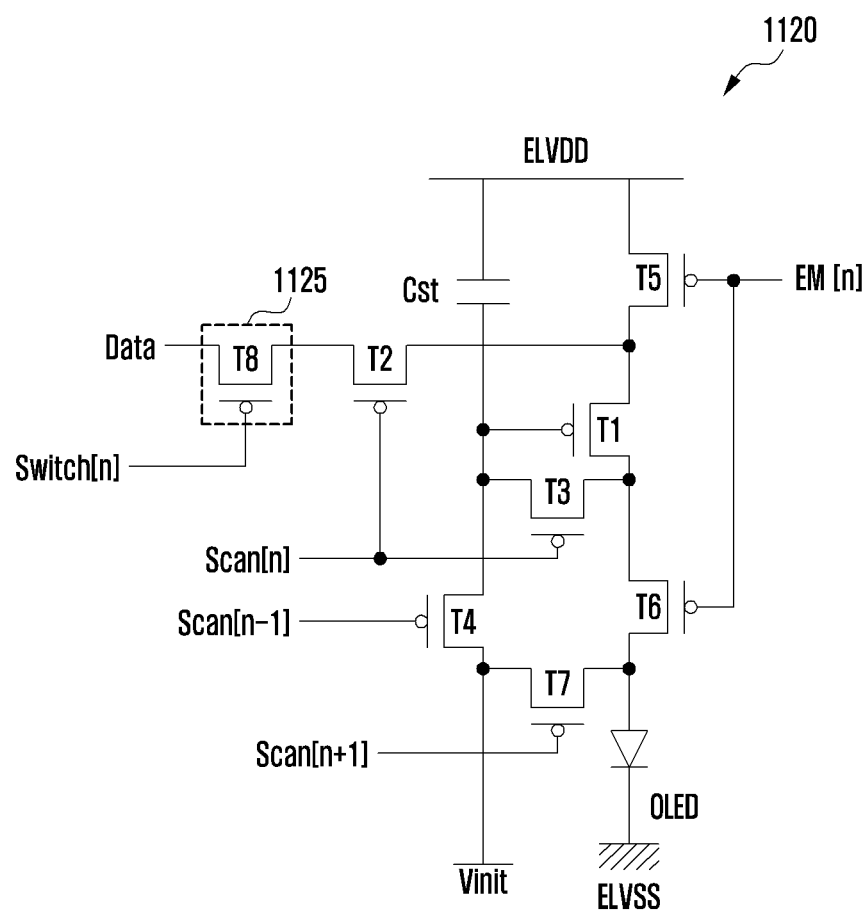
FIG. 11B is a view illustrating a pixel-driving circuit according to an embodiment.

FIG. 11B is a view illustrating a pixel-driving circuit 1120 according to an embodiment.

Referring to FIG. 11B, a pixel-driving circuit 1120 for driving each pixel of a display (e.g., the display 337 in FIG. 3) may include seven thin film transistors (e.g., T1 to T7), one capacitor (CST), and an organic light-emitting diode (OLED). Certain aspects of the pixel-driving circuit 1120 are disclosed in Korean Patent Laid-Open Publication No. 10-2016-0024191 (US Pat. Pub. 2018/0165533), incorporated herein by reference.

In an embodiment, the pixel-driving circuit 1120 included in each pixel may further include a thin film transistor T8 (1125). The processor is able to control the thin film transistor T8 (1125) to activate or deactivate the pixel.

In an embodiment, the processor may be configured as a single processor (e.g., the processor 340) or may be configured as a separate processor (e.g., a display driver IC (DDI)) that drives the display.

In an embodiment, the display driver IC may supply an image driving signal corresponding to image information received from a processor (e.g., the processor 340 in FIG. 3), to a display (e.g., the display 337 in FIG. 3) at a preset frame rate. The display driver IC may include a graphic RAM, an interface module, an image processing unit, a multiplexer, a display timing controller (T-con), a source driver, a gate driver, and/or an oscillator.

Figure 11C:
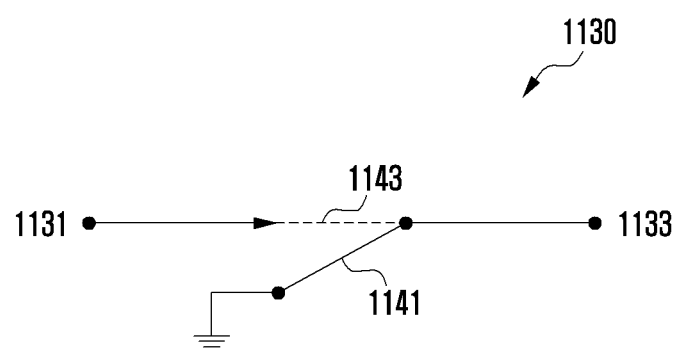
FIG. 11C is a view illustrating a thin film transistor T8 according to an embodiment.

FIG. 11C is a view 1130 illustrating a thin film transistor T8 (1125) according to an embodiment.

Referring to FIG. 11C, an electronic device (e.g., the processor 310 in FIG. 3) may perform control such that the thin film transistor T8 (1130) is turned off (1141) when the display is in the active state during wireless charging. Turning TFT T8 effectively creates an open circuit between a first data line 1131 and a second data line 1133. As the thin film transistor T8 1130 is controlled to be turned off (1141), the light-emitting signal transmitted from the first data line 1131 may not be transmitted to the second data line 1133. At least a part of the display corresponding to the second data line may be deactivated.

In an embodiment, when the display is switched from the active state to the inactive state, the processor may perform control such that the thin film transistor T8 (1130) is turned on (1143). As the thin film transistor T8 (1130) is controlled to be turned off (1143), the light-emitting signal transmitted from the first data line 1131 may be transmitted to the second data line 1133. At least part of the display corresponding to the second data line 1133 that has been deactivated may be switched to the active state.

Figure 12:
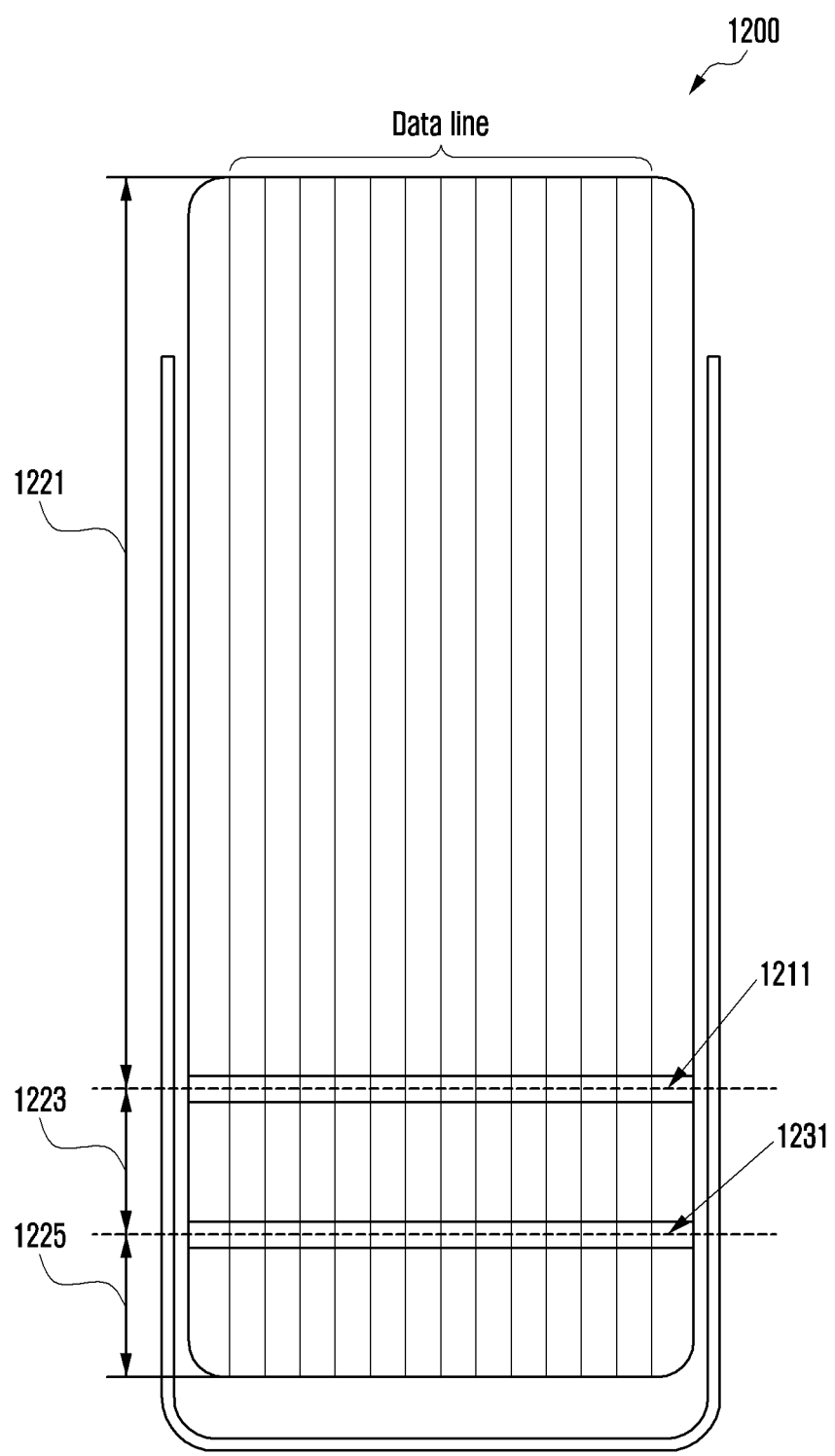
FIG. 12 is a view for describing a method of deactivating at least part of a flexible display depending on a reference point according to an embodiment.

FIG. 12 is a view 1200 for describing a method of deactivating at least part of a flexible display depending on a reference point according to an embodiment.

Referring to FIG. 12, a front perspective view of a display (e.g., the display 337 in FIG. 3) is illustrated in FIG. 12.

In an embodiment, a display (e.g., the display 512 in FIG. 5) may include multiple data lines and multiple gate lines (not illustrated) intersecting each other, and pixels formed at the intersections of the data lines and gate lines. Each pixel may include an organic light-emitting diode (OLED) and a pixel-driving circuit for driving the organic light-emitting diode.

In an embodiment, the display may be constituted with a flexible display, and may include a first face (e.g., the first face 5121 in FIG. 5) and a third face (e.g., the third face 5123 in FIG. 5), which are formed in planar faces, and a second face (e.g., the second face 5122 in FIG. 5), which is formed in a bendable face. For example, descriptions will be made assuming that reference numeral 1221 denotes a first face, which is the front face of the display, reference numeral 1223 denotes a second face, which is a side face of the display, and reference numeral 1225 denotes a third face, which is the rear face of the display.

In an embodiment, the electronic device may further include at least one switch line (e.g., the first switch line 1211 and the second switch line 1231) configured to perform control such that at least part of the display is deactivated when the display is in the active state during wireless charging.

In an embodiment, one or more switch lines 1211 and 1231 may be added to a driving circuit of a pixel corresponding to at least one of the first reference point 1017a or 1057a, the second reference point 1017b or 1057b, and the third point 1017c or 1057c in FIGS. 10A and 10B described above.

In the embodiment of FIG. 12, descriptions will be made assuming that the one or more switch lines 1211 and 1231 are added to the driving circuit of a pixel corresponding to a second reference point (e.g., the second reference point 1017b or 1057b in FIGS. 10A and 10B) or the third reference point (the third reference point 1017c or 1057c in FIGS. 10A and 10B).

In an embodiment, when the display is in the active state during wireless charging, the electronic device may control at least one switch line 1211 or 1231) so as to deactivate at least one of a region 1223 of a second face that is a side face and a region 1225 of a third face that is the rear face of the display. For example, an off-voltage may be supplied to the region 1223 of the second face and the region 1225 of the third face of the display via the first switch line 1211 so as to turn off the driving thin film transistor connected to the light-emitting signal line. Alternatively, an off-voltage may be supplied to the region 1225 of the third face of the display via the second switch line 1231 so as to turn off the driving thin film transistor connected to the light-emitting signal line.

In an embodiment, descriptions have been made assuming that two switch lines 1211 and 1231 are provided, but the disclosure is not limited thereto. The electronic device may include n switch lines, and a region for turning off the display by controlling the n switch lines may be set differently.

FIGS. 9-12 show preventing distortion by deactivating a portion of the display that overlaps a transmission or reception coil. In other embodiments, the transmission and reception coils that overlap the display can be deactivated as shown in FIGS. 13-14.

Figure 13:
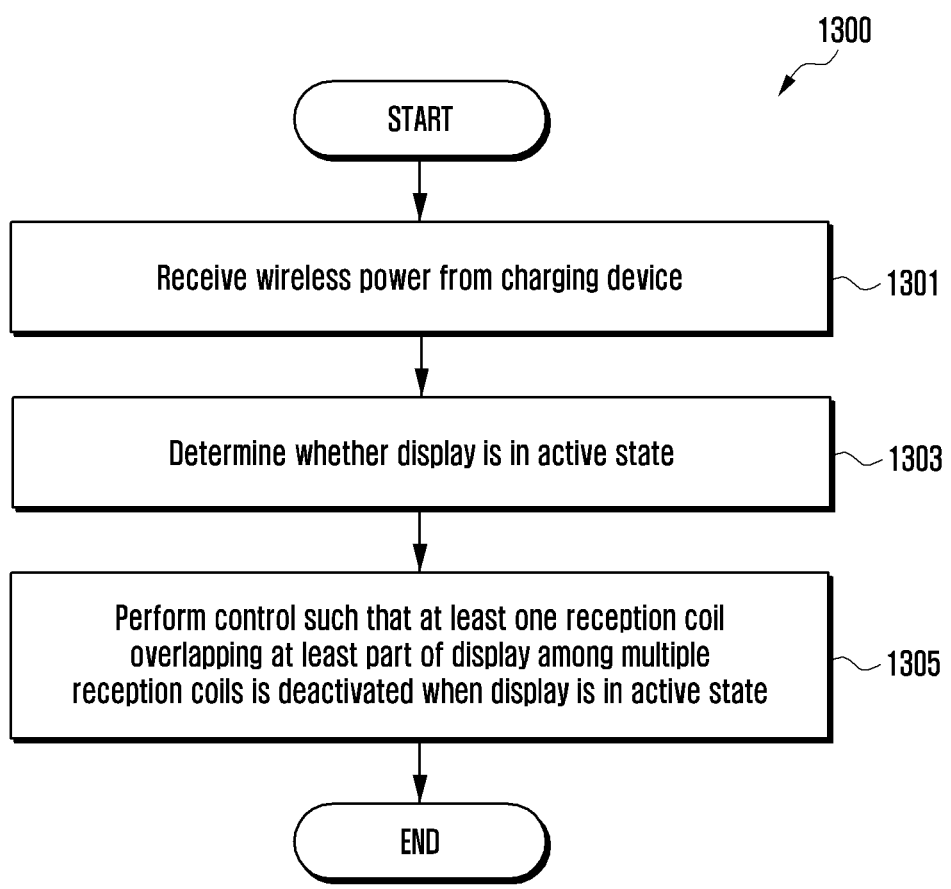
FIG. 13 is a flowchart for describing a wireless charging method of an electronic device including a flexible display according to an embodiment.

FIG. 13 is a flowchart 1300 for describing a wireless charging method of an electronic device including a flexible display according to an embodiment.

In an embodiment, each of an electronic device (e.g., the electronic device 310 in FIG. 3) and the charging device (e.g., the charging device 350 in FIG. 3) may include multiple reception coils and multiple transmission coils.

Referring to FIG. 13, in operation 1301, an electronic device (e.g., the electronic device 310 in FIG. 3) may receive wireless power from a charging device (e.g., the charging device 350 in FIG. 3). For example, a power reception unit (e.g., the power reception unit 320 in FIG. 3) of an electronic device may receive, via a reception coil (e.g., the reception coil 821 or 861 in FIGS. 8A and 8B), wireless power transmitted by a transmission coil (e.g., the transmission coil 831 or 871 in FIGS. 8A and 8B) of the charging device to charge a battery (e.g., the battery 325 in FIG. 3).

In an embodiment, in operation 1303, the electronic device may determine whether a display (e.g., the display 337 in FIG. 3) is in the active state. For example, the electronic device may determine whether the display is in the active state during the charging of the battery using wireless power received from the transmission coil of the charging device through the power reception unit.

In an embodiment, in operation 1305, when the display is in the active state, the electronic device may perform control such that at least one reception coil overlapping at least part of the display among the multiple coils is deactivated.

According to an embodiment, when it is determined that the display is in the inactive state in operation 1303, operation 1305 described above may be omitted.

Figure 14A:
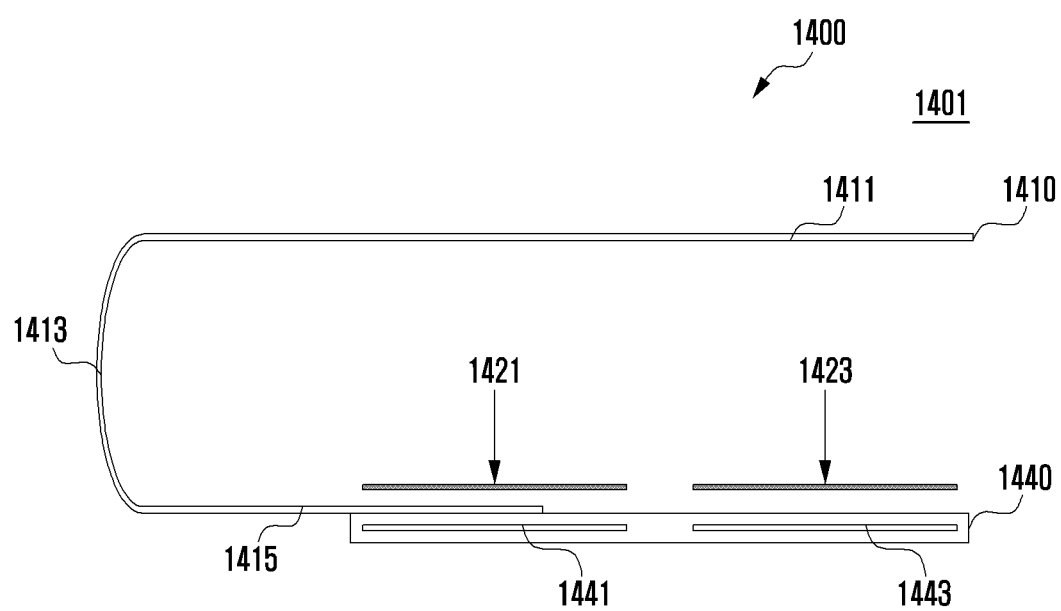
FIG. 14A and FIG. 14B are views for describing a wireless charging method of an electronic device including a flexible display according to an embodiment.
Figure 14B:
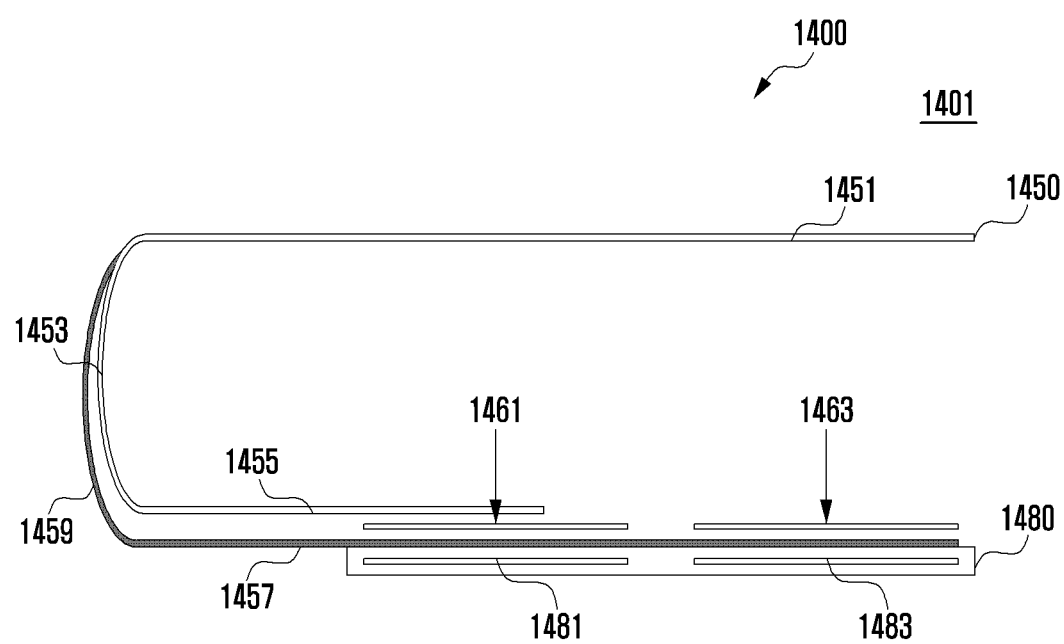

FIGS. 14A and 14B are views 1400 for describing a wireless charging method of an electronic device including a flexible display according to an embodiment.

Referring to FIG. 14A, a display 1410 (e.g., the display 512 in FIG. 5) of an electronic device 1401 (e.g., the electronic device 500 in FIG. 5) may be constituted with a flexible display, and may include a first face 1411 (e.g., the first face 5121 in FIG. 5), a second face 1413 (e.g., the second face 5122 in FIG. 5), and a third face 1415 (e.g., the third face 5123 in FIG. 5). In an embodiment, the first face

1411 and the third face 1415 may form a planar face, and the second face 1413 may form a bent face.

In an embodiment, the electronic device 1401 may include multiple reception coils (Rx coils) (e.g., a first reception coil 1421 and a second reception coil 1423) that receive wireless power for charging via a charging device 1440 (e.g., the charging device 350 in FIG. 3). The first reception coil 1421 and the second reception coil 1423 may be disposed in the space between the first face 1411 and the third face 1415 of the display 1410 in parallel to the third face 1415. The first reception coil 1421 and the second reception coil 1423 may be disposed on the same line to be spaced apart from each other by a predetermined distance.

In an embodiment, the charging device 1440 may include multiple transmission coils (e.g., a first transmission coil 1441 and a second transmission coil 1443).

In an embodiment, the first reception coil 1421 and the second reception coil 1423 of the electronic device 1401 may receive wireless power for charging from the first transmission coil 1441 and the second transmission coil 1443 of the charging device 1440, respectively.

In an embodiment, when the display 1410 is in the active state during wireless charging, the electronic device 1401 may deactivate the first reception coil 1421 overlapping a portion of the third face 1415 of the display 1410.

In an embodiment, the electronic device 1401 may transmit state information (e.g., information indicating that the display 1410 is in the active state) to the charging device 1440 via a wireless communication circuit (e.g., the wireless communication circuit 315 in FIG. 3). The charging device 1440 may deactivate the first transmission coil 1441, which transmits power to the first reception coil 1421, on the basis of the information indicating that the display 1410 is in the active state received from the electronic device 1401.

In an embodiment, the electronic device 1401 may transmit information indicating that the first reception coil 1421 is in the inactive state to the charging device 1440 via the wireless communication circuit 315 or the wireless charging module 250 based on the active state of the display 1410. The charging device 1440 may deactivate the first transmission coil 1441 corresponding to the first reception coil 1421 based on the information indicating that the first reception coil 1421 received from the electronic device 1401 is deactivated.

In an embodiment, as the first reception coil 1421 and the first transmission coil 1441 are deactivated, the electronic device 1401 may perform charging by receiving, via the second reception coil 1423, wireless power transmitted by the second transmission coil 1443 of the charging device 1440.

In an embodiment, upon detecting that the display 1410 is switched to the inactive state, the electronic device 1401 may activate the first reception coil 1421 that has been deactivated. The electronic device 1401 may transmit information indicating that the display 1410 has been switched to the inactive state to the charging device 1440 via the wireless communication circuit 315 or via the wireless charging module 250. The charging device 1440 may activate the first transmission coil 1441, which transmits wireless power to the first reception coil 1421, which has been deactivated, on the basis of the information indicating that the display 1410 has been switched to the inactive state received from the electronic device 1401.

In an embodiment, as the first reception coil 1421 and the first transmission coil 1441 are activated, the electronic device 1401 may perform charging by receiving, via the first reception coil 1421 and the second reception coil 1423, wireless power transmitted by the first transmission coil 1441 and the second transmission coil 1443 of the charging device 1440.

Although the reception coil shielding layers are not illustrated in FIG. 14A described above according to an embodiment, the reception coil shielding layers (e.g., the first reception coil shielding layer and the second reception coil shielding layer) may be disposed in the space between the first face 1411 of the display 1410 and the first and second reception coils 1421 and 1423 to be spaced apart from the first and second reception coils 1421 and 1423 by a predetermined distance, respectively.

In an embodiment, the reception coil shielding layers may be integrated into one and disposed in the space between the first face 1411 of the display 1410 and the first and second reception coils 1421 and 1423.

Referring to FIG. 14B, the display 1450 of the electronic device 1401 may be constituted with a flexible display, and may include a first face 1451, a second face 1453, and a third face 1455 as in FIG. 14A. In an embodiment, the first face 1451 and the third face 1455 may form a planar face, and the second face 1453 may form a bent face.

In an embodiment, the electronic device 1401 may include a first plate oriented in a first direction, a second plate 1457 (e.g., the second plate 521 in FIG. 5) spaced apart from the first plate and oriented in a second direction opposite the first direction to face away from the first plate.

In an embodiment, the electronic device 1401 may include a side member 1459 (e.g., the first sidewall 5211 in FIG. 5) that at least partially surrounds the space between the first plate and the second plate 1457.

In an embodiment, the display 1450 may be coupled to one face of the first plate.

In an embodiment, the electronic device 1401 may include multiple reception coils (Rx coils) (e.g., a first reception coil 1461 and a second reception coil 1463) that receive wireless power for charging via a charging device 1480. The first reception coil 1461 and the second reception coil 1463 may be disposed in the space between at least one of the first face 1451 and the third face 1455 of the display 1450 and the second plate 1457 in parallel to the third face 1455. The first reception coil 1461 and the second reception coil 1463 may be disposed on the same line to be spaced apart from each other by a predetermined distance.

In an embodiment, the charging device 1480 may include multiple transmission coils (e.g., a first transmission coil 1481 and a second transmission coil 1483).

In an embodiment, the first reception coil 1461 and the second reception coil 1463 of the electronic device 1401 may receive wireless power for charging from the first transmission coil 1481 and the second transmission coil 1483 of the charging device 1480, respectively.

In an embodiment, when the display is in the active state during wireless charging, the electronic device 1401 may deactivate the first reception coil 1461 disposed to overlap a portion of the third face 1455 of the display 1450.

In an embodiment, the electronic device 1401 may perform control such that the first transmission coil 1481, which transmits wireless power to the first reception coil 1461, is deactivated by transmitting information indicating the active state of the display 1450 to the charging device 1480 via a wireless communication circuit (e.g., the wireless communication circuit 315 in FIG. 3) or a wireless charging module (e.g., the charging module 250 in FIG. 2).

In an embodiment, as the first reception coil 1461 and the first transmission coil 1481 are deactivated, the electronic device 1401 may perform charging by receiving, via the second reception coil 1463, wireless power transmitted by the second transmission coil 1483 of the charging device 1480.

In an embodiment, upon detecting that the display 1450 has been switched from the active state to the inactive state, the electronic device 1401 may activate the first reception coil 1461 that has been deactivated.

In an embodiment, the electronic device 1401 may perform control such that the first transmission coil 1481, which transmits wireless power to the first transmission coil 1461, which has been deactivated, is activated by transmitting information indicating that the display 1450 has been switched to the inactive state to the charging device 1480 via the wireless communication circuit.

In an embodiment, as the first reception coil 1461 and the first transmission coil 1481 are activated, the electronic device 1401 may perform charging by receiving, via the first reception coil 1461 and the second reception coil 1463, wireless power transmitted by the first transmission coil 1481 and the second transmission coil 1483 of the charging device 1480.

In the embodiment of FIGS. 14A and 14B, since the first reception coil 1421 or 1461, which is disposed to overlap a portion of the third face 1415 or 1455 of the display 1410 or 1450, and the first transmission coil 1441 or 1481, which transmits wireless power to the first reception coil 1421 or 1461, are deactivated, it is possible to prevent the occurrence of a phenomenon in which at least part of the third face 1415 or 1455 of the display 1410 or 1450 is distorted by magnetic fields. Since the phenomenon in which at least part of the third face 1415 or 1455 of the display 1410 or 1450 is distorted does not occur, it is also possible to prevent the occurrence of a phenomenon in which the first face 1411 or 1451, which is the front face of the display 1410 or 1450, is distorted.

Although the reception coil shielding layers are not illustrated in FIG. 14B described above according to an embodiment, the reception coil shielding layers (e.g., the first reception coil shielding layer and the second reception coil shielding layer) may be disposed in the space between at least one of the first face 1451 and the third face 1455 of the display 1450 and the first and second reception coils 1461 and 1463 to be spaced apart from the first and second reception coils 1461 and 1463 by a predetermined distance, respectively.

In an embodiment, the reception coil shielding layers may be integrated into one and disposed in the space between the third face 1455 of the display 1450 and the first and second reception coils 1461 and 1463.

In an embodiment, a charging device 1480 may include a first portion in contact with the second plate 1457 of the electronic device 1401 and a second portion spaced apart from the first portion and facing away from the first portion.

Although the transmission coil shielding layers are not illustrated in FIGS. 14A and 14B described above, the transmission coil shielding layers (e.g., the first transmission coil shielding layer and the second transmission coil shielding layer) may be disposed in the space formed between the second portion of the charging device 1480 and the first transmission coil 1441 or 1481 and the second transmission coil 1443 or 1483 to be spaced apart from the first transmission coil 1441 or 1481 and the second transmission coil 1443 or 1483 by a predetermined distance, respectively.

In an embodiment, the transmission coil shielding layers may be integrated into one and disposed in the space between the second portion of the charging device 1480 and the first transmission coil 1441 or 1481 and the second transmission coil 1443 or 1483.

FIG. 15 shows an embodiment with a display 1510 with a first face 1511, a second face 1513, a third face 1515, a fourth face 1517, and a fifth face 1519.

Figure 15A:
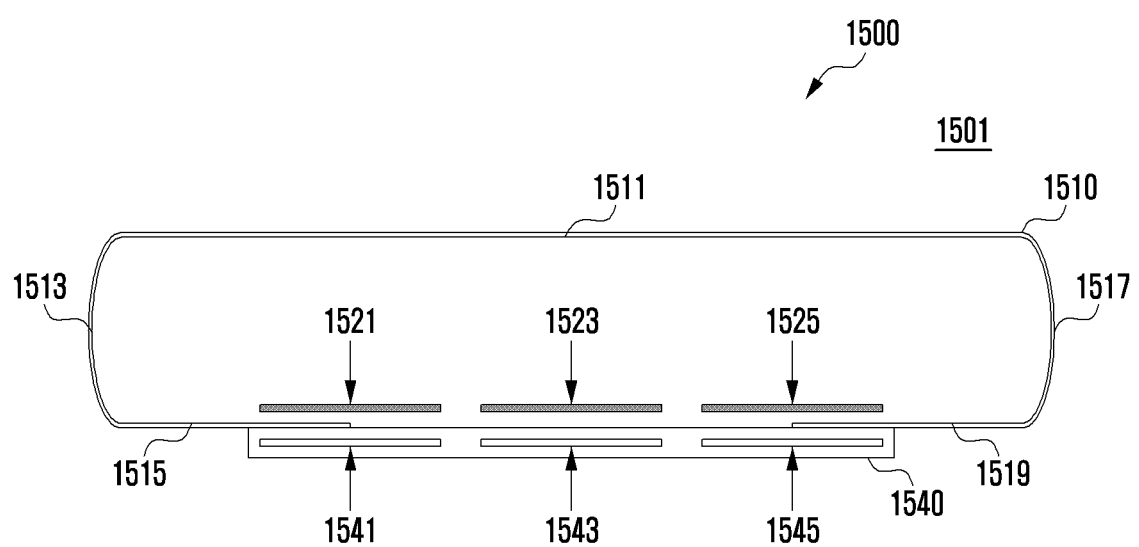
FIG. 15A and FIG. 15B are views for describing a wireless charging method of an electronic device including a flexible display according to an embodiment.
Figure 15B:
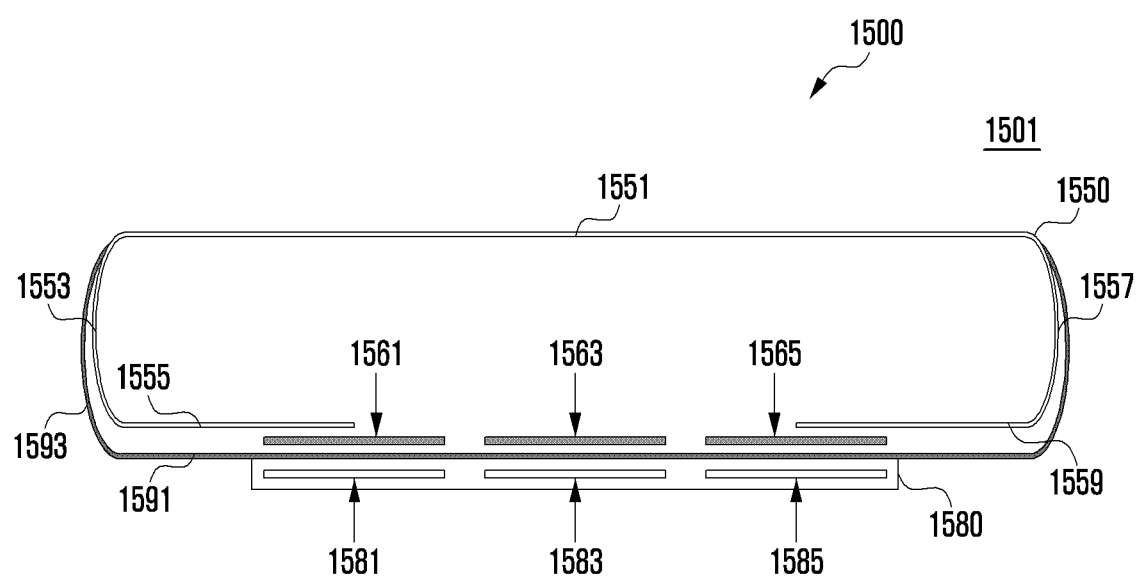

FIGS. 15A and 15B are views 1500 for describing a wireless charging method of an electronic device including a flexible display according to an embodiment.

Referring to FIG. 15A, a display 1510 (e.g., the display 512 in FIG. 5) of an electronic device 1501 (e.g., the electronic device 500 in FIG. 5) may be constituted with a flexible display, and may include a first face 1511, a second face 1513, a third face 1515, a fourth face 1517, and a fifth face 1519. In an embodiment, the first face 1511, the third face 1515, and the fifth face 1519 may form a planar face, and the second face 1513 and the fourth face 1517 may form a bent face.

In an embodiment, the electronic device 1501 may include multiple reception coils (Rx coils) (e.g., a first reception coil 1521, a second reception coil 1523, and a third reception coil 1525) that receive wireless power for charging via a charging device 1540 (e.g., the charging device 350 in FIG. 3). The first reception coil 1521, the second reception coil 1523, and the third reception coil 1525 may be disposed in the space between the first face 1511 and the third face 1515 and the fifth face 1519 of the display 1510 in parallel to the third face 1515.

In an embodiment, the charging device 1540 may include multiple transmission coils (e.g., a first transmission coil 1541, a second transmission coil 1543, and a third transmission coil 1545).

In an embodiment, the first reception coil 1521, the second reception coil 1523, and the third reception coil 1525 of the electronic device 1501 may receive wireless power for charging from the first transmission coil 1541, the second transmission coil 1543, and the third transmission coil 1545 of the charging device 1540, respectively.

In an embodiment, when the display 1510 is in the active state during wireless charging, the electronic device 1501 may deactivate one or more reception coils (e.g., the first reception coil 1521 and the third reception coil 1525) disposed to overlap at least part of the third face 1515 and the fifth face 1519 of the display 1510 among the multiple reception coils 1521, 1523, and 1525 disposed in the space between the first face 1511 and the third face 1515 and the fifth face 1519 of the display 1510.

In an embodiment, the electronic device 1501 may transmit information indicating the active state of the display 1510 to the charging device 1540 via a wireless communication circuit (e.g., the wireless communication circuit 315 in FIG. 3) or a wireless charging module (e.g., the charging module 250 in FIG. 2). The charging device 1540 may deactivate the first transmission coil 1541, which transmits wireless power to the first reception coil 1521 and the third transmission coil 1545, which transmits power to the third reception coil 1525, on the basis of the information indicating that the display 1510 is in the active state received from the electronic device 1501.

In an embodiment, as the first reception coil 1521, the third transmission coil 1525, the first transmission coil 1541, and the third transmission coil 1545 are deactivated, the electronic device 1501 may perform charging by receiving, via the second reception coil 1523, wireless power transmitted by the second transmission coil 1543 of the charging device 1540.

In an embodiment, upon detecting that the display 1510 has been switched from the active state to the inactive state, the electronic device 1501 may activate the first reception coil 1521 and the third reception coil 1525 that have been deactivated. The electronic device 1501 may transmit information indicating that the display 1510 has been switched to the inactive state to the charging device 1540.

In an embodiment, the charging device 1540 may activate the first transmission coil 1541, which wirelessly transmits power to the first reception coil 1521, which has been deactivated, and the third transmission coil 1545, which wirelessly transmits power to the third transmission coil 1525, on the basis of the information indicating that the display 1510 has been switched to the inactive state.

In an embodiment, as the first reception coil 1521, the third reception coil 125, the first transmission coil 1541, and the third transmission coil 1545 are activated, the electronic device 1501 may perform charging by receiving, via the first to third reception coils 1521, 1523, and 1525, wireless power transmitted by the first to third transmission coils 1541, 1543, and 1545 of the charging device 1540.

Although the reception coil shielding layers are not illustrated in FIG. 15A described above according to an embodiment, the reception coil shielding layers (e.g., the first reception coil shielding layer, the second reception coil shielding layer, and the third reception coil shielding layer) may be disposed in the space between the first face 1511 of the display 1510 and the first, second, and third reception coils 1521, 1523, and 1525 to be spaced apart from the first, second, and third reception coils 1521, 1523, and 1525 by a predetermined distance, respectively.

In an embodiment, the reception coil shielding layers may be integrated into one and disposed in the space between the first face 1511 of the display 1510 and the first, second, and third reception coils 1521, 1523, and 1525.

Referring to FIG. 15B, the display 1550 of the electronic device 1501 may be constituted with a flexible display, and may include a first face 1551, a second face 1553, a third face 1555, a fourth face 1557, and a fifth face 1559 as in FIG. 15A. In an embodiment, the first face 1551, the third face 1555, and the fifth face 1559 may form a planar face, and the second face 1553 and the fourth face 1557 may form a bent face.

In an embodiment, the electronic device 1501 may include a first plate oriented in a first direction, a second plate 1591 (e.g., the second plate 521 in FIG. 5) spaced apart from the first plate and oriented in a second direction opposite the first direction to face away from the first plate.

In an embodiment, the electronic device 1501 may include a side member 1593 (e.g., the first sidewall 5211 in FIG. 5) that at least partially surrounds the space between the first plate and the second plate 1591.

In an embodiment, the display 1550 may be coupled to one face of the first plate.

In an embodiment, the electronic device 1501 may include multiple reception coils (Rx coils) (e.g., a first reception coil 1561, a second reception coil 1563, and a third reception coil 1565) that receive wireless power for charging via a charging device 1580 (e.g., the charging device 350 in FIG. 3). The first reception coil 1561, the second reception coil 1563, and the third reception coil 1565 may be disposed in the space between at least one of the first face 1551, the third face 1555, and the fifth face 1559 of the display 1550 and the second plate 1591.

In an embodiment, the first reception coil 1561, second reception coil 1563, and the second reception coil 1565 may be disposed on the same line to be spaced apart from each other by a predetermined distance.

In an embodiment, the charging device 1580 may include multiple transmission coils (e.g., a first transmission coil 1581, a second transmission coil 1583, and a third transmission coil 1585).

In an embodiment, when the display 1550 is activated during wireless charging, the electronic device 1501 may deactivate one or more reception coils (e.g., the first reception coil 1561 and the third reception coil 1565) disposed to overlap at least part of the third face 1555 and the fifth face 1559 of the display 1550 among the multiple reception coils 1561, 1563, and 1565 disposed in the space between the first face 1551, the third face 1555, and the fifth face 1519 of the display 1550 and the second plate 1591.

In an embodiment, the electronic device 1501 may perform control such that the first transmission coil 1581, which transmits wireless power to the first reception coil 1561, and the third transmission coil 1585, which transmits wireless power to the third reception coil 1565, are deactivated by transmitting information indicating the active state of the display 1550 to the charging device 1580 via a wireless communication circuit (e.g., the wireless communication circuit 315 in FIG. 3) or a wireless charging module (e.g., the charging module 250 in FIG. 2).

In an embodiment, as the first reception coil 1561, the third reception coil 1565, the first transmission coil 1581, and the third transmission coil 1585 are deactivated, the electronic device 1501 may perform charging by receiving, via the second reception coil 1563, wireless power transmitted by the second transmission coil 1583 of the charging device 1580.

In an embodiment, upon detecting that the display 1550 has been switched from the active state to the inactive state, the electronic device 1501 may activate the first reception coil 1561 and the third reception coil 1565 that have been deactivated.

In an embodiment, the electronic device 1501 may perform control such that the first transmission coil 1581, which transmits wireless power to the first reception coil 1561, which has been deactivated, and the third transmission coil 1585, which transmits wireless power to the third reception coil 1565, are activated by transmitting information indicating that the display has been switched to the inactive state to the charging device 1580.

In an embodiment, as the first reception coil 1561, the third reception coil 1565, the first transmission coil 1581, and the third transmission coil 1585 are activated, the electronic device 1501 may perform charging by receiving, via the first to third reception coils 1561, 1563, and 1565, wireless power transmitted by the first to third transmission coils 1581, 1583, and 1585 of the charging device 1580.

In the embodiment of FIGS. 15A and 15B, since the first reception coil 1521 or 1561 and the third reception coil 1525 or 1565, which are disposed to overlap a portion of the third face 1515 or 1555 and the fifth face 1519 or 1559 of the display 1550, the first transmission coil 1541 or 1581, which transmits wireless power to the first reception coil 1521 or 1561, and the third transmission coil 1545 or 1585, which transmits wireless power to the third reception coil 1525 or 1565, are deactivated, it is possible to prevent the occurrence of a phenomenon in which at least part of the third face 1515 or 1555 and the fifth face 1519 or 1559 of the display 1550 is distorted by magnetic fields. Since the phenomenon in which at least part of the third face 1515 or 1555 and the fifth face 1519 or 1559 of the display 1550 is distorted does not occur, it is also possible to prevent a phenomenon in which the first face 1511 or 1551, which is the front face of the display 1550, is distorted.

Although the reception coil shielding layers are not illustrated in FIG. 15B described above according to an embodiment, the reception coil shielding layers (e.g., the first reception coil shielding layer, the second reception coil shielding layer, and the third reception coil shielding layer) may be disposed in the space between the third face 1555 and the fifth face 1559 of the display 1550 and the first, second, and third reception coils 1561, 1563, and 1565 to be spaced apart from the first, second, and third reception coils 1561, 1563, and 1565 by a predetermined distance, respectively.

In an embodiment, the reception coil shielding layers may be integrated into one and disposed in the space between the third face 1555 and the fifth face 1559 of the display 1550 and the first, second, and third reception coils 1561, 1563, and 1565.

In an embodiment, a charging device 1580 may include a first portion in contact with the second plate 1591 of the electronic device 1501 and a second portion spaced apart from the first portion and facing away from the first portion.

Although the transmission coil shielding layers are not illustrated in FIGS. 15A and 15B described above, the transmission coil shielding layers (e.g., the first transmission coil shielding layer, the second transmission coil shielding layer, and the third transmission coil shielding layer) may be disposed in the space between the second portion of the charging device 1580 and the first transmission coil 1541 or 1581, the second transmission coil 1543 or 1583, and the third transmission coil 1545 or 1585 to be spaced apart from the first transmission coil 1541 or 1581, the second transmission coil 1543 or 1583, and the third transmission coil 1545 or 1585 by a predetermined distance, respectively.

In an embodiment, the transmission coil shielding layers may be integrated into one and disposed in the space between the second portion of the charging device 1580 and the first transmission coil 1541 or 1581, the second transmission coil 1543 or 1583, and the third transmission coil 1545 or 1585.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a housing including a first plate, a second plate spaced apart from the first plate and facing away from the first plate, and a side member at least partially surrounding a space between the first plate and the second plate;
   a touchscreen display including a first portion exposed through or mounted on at least part of the first plate, and a second portion extending from the first portion and bendable into the space such that the second portion is positioned or positionable between the first portion and the second plate;
   a conductive coil disposed in the space between the first portion and the second plate or in a space between the first portion and the second portion in parallel to the second plate;
   a wireless charging circuit electrically connected to the conductive coil;
   a first shielding layer interposed between the conductive coil and at least part of the first portion of the touchscreen display; and
   a second shielding layer interposed between the second plate and at least part of the second portion of the touchscreen display.

2. The electronic device of claim 1, wherein the second shielding layer extends from the first shielding layer.

3. The electronic device of claim 1, wherein the second shielding layer is separated from the first shielding layer.

4. The electronic device of claim 1, wherein the first shielding layer and the second shielding layer are made of at least one of graphite filler, alumina, ceramic, and carbon nanotubes depending on a characteristic of the conductive coil.

5. The electronic device of claim 1, further comprising:
   a first structure including the first plate; and
   a second structure including the second plate and disposed to surround at least part of the first structure,
   wherein the first structure is disposed to be movable to an open state or a closed state with respect to the second structure in a direction parallel to the second plate.

6. The electronic device of claim 5, wherein the closed state is a state in which the first structure is located at a first distance from the side member, and the open state is a state in which the first structure is located at a second distance from the side member, and
   wherein the second distance is greater than the first distance.

7. The electronic device of claim 1, wherein the conductive coil disposed between the first portion and the second plate is disposed to extend to at least a region of the space between the second portion and the second plate.

8. The electronic device of claim 5, wherein the second structure includes a rear plate that covers at least part of the second portion.

9. The electronic device of claim 1, wherein the first shielding layer has a length greater than a length of the conductive coil.

* * * * *